US006929783B2

(12) United States Patent
Chung et al.

(10) Patent No.: US 6,929,783 B2
(45) Date of Patent: Aug. 16, 2005

(54) METHOD AND APPARATUS FOR PRODUCING AND TREATING NOVEL ELASTOMER COMPOSITES

(75) Inventors: Bin Chung, Nashua, NH (US); Susan W. Green, Boxboro, MA (US); Ivan Z. Podobnik, Mason, NH (US); Joseph Cianciolo, Methuen, MA (US)

(73) Assignee: Cabot Corporation, Boston, MA (US)

( * ) Notice: Subject to any disclaimer, the term of this patent is extended or adjusted under 35 U.S.C. 154(b) by 715 days.

(21) Appl. No.: 10/051,357

(22) Filed: Jan. 18, 2002

(65) Prior Publication Data

US 2002/0086917 A1 Jul. 4, 2002

Related U.S. Application Data

(62) Division of application No. 09/549,051, filed on Apr. 13, 2000.
(60) Provisional application No. 60/129,791, filed on Apr. 16, 1999.

(51) Int. Cl.⁷ .................................................. B01J 10/00
(52) U.S. Cl. ....................... 422/187; 422/224; 422/225; 422/229; 422/232; 422/233; 422/291; 422/292; 524/495
(58) Field of Search .............................. 422/187, 224, 422/225, 229, 232, 233, 291, 292; 524/495; 523/351

(56) References Cited

U.S. PATENT DOCUMENTS

| | | |
|---|---|---|
| 1,611,278 A | 12/1926 | Peterson |
| 1,846,820 A | 2/1932 | Darling |
| 2,769,795 A | 11/1956 | Braendle |
| 3,048,559 A | 8/1962 | Heller |
| 3,108,982 A | 10/1963 | Barclay |
| 3,335,200 A | 8/1967 | Thorn |
| 3,403,121 A | 9/1968 | Hare |
| 3,494,740 A | 2/1970 | Speck |
| 3,623,703 A | 11/1971 | Nielander |
| 3,695,585 A | 10/1972 | Nielander |
| 3,767,605 A | 10/1973 | Gerlicher |
| 3,887,532 A | 6/1975 | Nubert |
| 4,025,711 A | 5/1977 | Davidson |
| 4,029,633 A | 6/1977 | Hagopian |
| 4,064,093 A | 12/1977 | Dalton |
| 4,103,074 A | 7/1978 | Hertel |
| 4,124,550 A | 11/1978 | Kobayashi |
| 4,146,508 A | 3/1979 | Maxwell |
| 4,213,957 A | 7/1980 | Hunt |
| 4,265,939 A | 5/1981 | Tebbens |
| 4,299,952 A | 11/1981 | Pingel |
| 4,302,377 A | 11/1981 | Gurak |
| 4,303,569 A | 12/1981 | Gurak |
| 4,375,497 A | 3/1983 | Sandstrom |
| 4,446,309 A | 5/1984 | Jiroumaru |

(Continued)

FOREIGN PATENT DOCUMENTS

| | | |
|---|---|---|
| CH | 581493 | 11/1976 |
| DE | 909255 | 4/1954 |
| DE | 1063364 | 8/1959 |
| DE | 1620918 | 3/1972 |
| DE | 3916981 | 7/1989 |
| EP | 051450 | 5/1982 |
| EP | 0278743 | 8/1988 |
| EP | 0287138 | 10/1988 |
| EP | 0287392 | 10/1988 |
| EP | 0423759 | 4/1991 |
| EP | 0570715 | 11/1993 |
| EP | 0620250 | 3/1994 |
| EP | 0763558 | 3/1997 |
| GB | 705334 | 3/1954 |
| GB | 1421011 | 1/1976 |
| GB | 2098972 | 12/1981 |
| GB | 2196547 | 5/1988 |
| JP | 57 053340 | 3/1982 |
| WO | WO96/37547 | 11/1996 |
| WO | WO97/36724 | 10/1997 |
| WO | WO99/16600 | 4/1999 |

OTHER PUBLICATIONS

Written Opinion dated May 17, 2001 in corresponding PCT/US00/09925.
PCT/US97/05276 International Search Report Patent Family Annex.

(Continued)

*Primary Examiner*—Edward J. Cain

(57) ABSTRACT

Elastomer masterbatch is processed in a continuous compounder having multiple parallel elongate rotors axially oriented in an elongate processing chamber. Optionally, additional materials are compounded into the masterbatch, e.g., additives, other elastomeric compositions, etc. Preferably, the masterbatch then is further processed in an open mill. Excellent control of Mooney Viscosity is achieved.

In certain preferred embodiments, elastomer composites are produced by novel continuous flow methods and apparatus in which fluid streams of particulate filler and elastomer latex are fed to the mixing zone of a coagulum reactor to form a coagulated mixture in semi-confined flow continuously from the mixing zone through a coagulum zone to a discharge end of the reactor. The particulate filler fluid is fed under high pressure to the mixing zone, such as to form a jet stream to entrain elastomer latex fluid sufficiently energetically to substantially completely coagulate the elastomer with the particulate filler prior to the discharge end without need of adding acid or salt solution or other coagulation step. The coagulated elastomer and particulate filler composite is fed into the aforesaid continuous compounder for processing and control of its moisture level and Mooney Viscosity. Novel elastomer composites are produced. Such novel elastomer composites combine material properties and characteristics, such as choice of filler, elastomer, level of filler loading, moisture level, Mooney Viscosity, balance between molecular weight and amount of bound rubber, and macrodispersion not previously achieved.

3 Claims, 8 Drawing Sheets

U.S. PATENT DOCUMENTS

| | | |
|---|---|---|
| 4,456,381 A | 6/1984 | Inoue |
| 4,542,992 A | 9/1985 | Markhart |
| 4,552,725 A | 11/1985 | Audeh |
| 4,643,890 A | 2/1987 | Schramm |
| 4,718,771 A | 1/1988 | Asai |
| 4,744,744 A | 5/1988 | Sugimori |
| 4,771,092 A | 9/1988 | Ollenik |
| 4,914,186 A | 4/1990 | Miss |
| 4,917,211 A | 4/1990 | Yamada |
| 4,917,501 A | 4/1990 | Simonet |
| 5,009,849 A | 4/1991 | Ebner |
| 5,047,287 A | 9/1991 | Horiuchi |
| 5,119,927 A | 6/1992 | Bruggemann |
| 5,205,972 A | 4/1993 | Kafka |
| 5,227,425 A | 7/1993 | Rauline |
| 5,264,290 A | 11/1993 | Touchet |
| 5,328,949 A | 7/1994 | Sandstrom |
| 5,430,088 A | 7/1995 | Ohashi |
| 5,472,928 A | 12/1995 | Schuerman |
| 5,516,833 A | 5/1996 | Ohashi |
| 5,558,316 A | 9/1996 | Lee |
| 5,599,868 A | 2/1997 | Bohm |
| 5,639,817 A | 6/1997 | Probst |
| 5,658,657 A | 8/1997 | Tomizawa |
| 5,672,006 A | 9/1997 | Hanada |
| 5,733,440 A | 3/1998 | Stangeland |
| 5,863,117 A | 1/1999 | Gheorghita |
| 6,040,364 A | 3/2000 | Mabry |
| 6,048,923 A | 4/2000 | Mabry |
| 6,075,084 A | 6/2000 | Mabry |

OTHER PUBLICATIONS

PCT/US97/05276 Jan. 13, 1998 Written Opinion.
PCT/US98/20279 Nov. 2, 1999 International Search Report.
PCT/US98/20279 Jan. 20, 2000 Preliminary Examination Report.
Wahab, Shukri Bin Abdul et al., Natural Rubber Carbon Black Masterbatches from Field Latex, pp. 29–41, Proceedings of NR Technology Seminar, Rubber Research Institute of Malaysia, Kuala Lumpur, Malaysia, Dec., 1978.
Database WPI, week 9345, Derwent publications Ltd., London, GB, AN 93–357278, XP002036310 & JP 05 262 918A (Yokohama Rubber Co., Ltd.), Oct. 12, 1993.
"Continuous Mixers for the Polymer Industry" Farrel Corporation Bulletin No. 234–B 1993.
Functionalization of Elastomer by Reactive Mixing by the Malaysian Rubber Producers' Research Associate, the Common Fund for Commodities, p. 308–312, Research Disclosure, Jun. 1994.
"CP—Series II Compact Processor" Farrel Corporation Bulletin No. 262–C 1995.

METHOD AND APPARATUS FOR PRODUCING AND TREATING NOVEL ELASTOMER COMPOSITES

This application is a divisional application of and claims priority to application Ser. No. 09/549,051 filed Apr. 13, 2000, and claims priority to provisional application Ser. No. 60/129,791, filed on Apr. 16, 1999, the disclosures of which are incorporated herein by reference.

FIELD OF THE INVENTION

The present invention is directed to novel methods and apparatus for producing and treating elastomer composites, and to novel elastomer composites produced using such methods and apparatus. More particularly, the invention is directed to continuous flow methods and apparatus for producing and treating elastomer masterbatch of particulate filler finely dispersed in elastomer, for example, elastomer composites of carbon black particulate filler finely dispersed in natural rubber, and rubber materials and products formed of such masterbatch compositions.

BACKGROUND

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, elastomer coagulated with carbon black or other filler and optionally containing various additives, such as extender oil. Carbon black masterbatch can be prepared with different grades of carbon black, that is, carbon blacks which vary both in surface area per unit weight and in "structure."

While a wide range of performance characteristics can be achieved employing currently available materials and manufacturing techniques, there has been a longstanding need in the industry to develop elastomeric compositions having improved properties and to reduce the cost and complexity of current manufacturing techniques. In particular, it is known for example that macro-dispersion level, that is, the uniformity of dispersion of the carbon black or other filler within the elastomer, can significantly impact performance characteristics. For elastomeric compositions prepared by intensively mixing the carbon black or other filler with natural rubber or other elastomer (such as in a Banbury mixer or the like), any increase in macro-dispersion requires longer or more intensive mixing, with the consequent disadvantages of increased energy costs, manufacturing time, and similar concerns. For carbon black fillers of certain surface area and structure characteristics, dispersion beyond a certain degree has not been possible or commercially practicable using known mixing apparatus and techniques. In addition, such prolonged or more intensive mixing degrades the natural rubber or other elastomer by reducing its molecular weight, rendering the finished elastomeric compound undesirable for certain applications.

In addition to dry mixing techniques, it is known to continuously feed latex and a carbon black slurry to an agitated coagulation tank. Such "wet" techniques are used commonly with synthetic elastomer, such as styrene-butadiene rubber (SBR). The coagulation tank contains a coagulant such as salt solution or an aqueous acid solution typically having a pH of about 2.5 to 4. The latex and carbon black slurry are mixed and then coagulated in the coagulation tank into small beads (typically a few millimeters in diameter) referred to as wet crumb. The crumb and acid (or saline) effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like. Variations on this method have been suggested for the coagulation of natural and synthetic elastomers. In U.S. Pat. No. 4,029,633 to Hagopian et al, which like the present invention is assigned to Cabot Corporation, a continuous process for the preparation of elastomer masterbatch is described. An aqueous slurry of carbon black is prepared and mixed with a natural or synthetic elastomer latex. This mixture undergoes a so-called creaming operation, optionally using any of various known creaming agents. Following the creaming of the carbon black/latex mixture, it is subjected to a coagulation step. Specifically, the creamed carbon black/latex mixture is introduced as a single coherent stream into the core of a stream of coagulating liquor. The solid stream of creamed carbon black/latex mixture is said to undergo shearing and atomizing by the stream of coagulating liquor prior to coagulation, being then passed to a suitable reaction zone for completion of the coagulation. Following such coagulation step, the remainder of the process is substantially conventional, involving separation of the crumb from the waste product "serum" and washing and drying of the crumb. A somewhat similar process is described in U.S. Pat. No. 3,048,559 to Heller et al. An aqueous slurry of carbon black is continuously blended with a stream of natural or synthetic elastomer latex. The two streams are mixed under conditions described as involving violent hydraulic turbulence and impact. As in the case of the Hagopian et al. patent mentioned above, the combined stream of carbon black slurry and elastomer latex is subsequently coagulated by the addition of an acid or salt coagulant solution.

Since good dispersion of a coagulating filler in the elastomer has been recognized for some time as being important for achieving good quality and consistent product performance, considerable effort has been devoted to the development of procedures for assessing dispersion quality in rubber. Methods developed include, e.g. the Cabot Dispersion Chart and various image analysis procedures. Dispersion quality can be defined as the state of mixing achieved. An ideal dispersion of carbon black is the state in which the carbon black agglomerates (or pellets) are broken down into aggregates (accomplished by dispersive mixing) uniformly separated from each other in the elastomer (accomplished by distributive mixing), with the surfaces of all the carbon black aggregates completely wetted by the rubber matrix (usually referred to as incorporation).

Macro-dispersion of carbon black or other filler in uncured natural rubber or other suitable elastomer can be assessed using image analysis of cut surface samples. Typically, five to ten arbitrarily selected optical images are taken of the cut surface for image analysis. Knife marks and the like preferably are removed using a numerical filtering technique. Cut surface image analysis thus provides information regarding the carbon black dispersion quality inside a natural rubber compound. Specifically, percent undispersed area $D(\%)$ indicates carbon black macro-dispersion quality. As macro-dispersion quality is degraded, percent undispersed area increases. Dispersion quality can be improved, therefore, by reducing the percent undispersed area.

A commercial image analyzer such as the IBAS Compact model image analyzer available from Kontron Elektronik GmbH (Munich, Germany) can be used to measure macro-dispersion of carbon black or other filler. Typically, in quantitative macro-dispersion tests used in the rubber industry, the critical cut-off size is 10 microns. Defects larger than about 10 microns in size typically consist of undispersed carbon black or other filler, as well as any grit or other contaminants, which can affect both visual and functional performance. Thus, measuring macro-dispersion involves measuring defects on a surface (generated by microtoming, extrusion or cutting) greater than 10 microns in size, by total area of such defects per unit area examined, using an image analysis procedure. Macro-dispersion D(%) is calculated as follows:

$$\text{Undispersed area}(\%) = \frac{1}{A_m} \sum_{i=1}^{m} N_i \frac{\pi D_i^2}{4}$$

where $A_m$=Total sample surface area examined $N_i$=Number of defects with size $D_i$ $D_i$=Diameter of circle having the same area as that of the defect (equivalent circle diameter)

m=number of images

There has long been a need in various industries for elastomeric compounds of particulate filler dispersed in suitable elastomer, especially, for example, carbon black dispersed in natural rubber, having improved macro-dispersion. As discussed above, improved macro-dispersion can provide correspondingly improved aesthetic and functional characteristics. Especially desirable are new elastomeric compounds of carbon black in natural rubber wherein improved macro-dispersion is achieved together with controlled Mooney Viscosity, higher molecular weight of the natural rubber, and higher amount of bound rubber.

It is an object of the present invention to meet some or all of these long felt needs.

SUMMARY OF THE INVENTION

In accordance with a first aspect, a method of treating a substantially coagulated masterbatch having a particulate filler and an elastomer includes the steps of feeding the masterbatch to a feed port of a continuous compounder having multiple rotors axially oriented in an elongate processing chamber; processing the masterbatch through the processing chamber of the continuous compounder by controlled operation of the rotors; and discharging the masterbatch from a discharge orifice of the continuous compounder. In certain preferred embodiments, the method may also include the step of passing the masterbatch from the discharge orifice of the continuous compounder through an open mill and/or the step of compounding additional material into the masterbatch in the continuous compounder. In certain preferred embodiments, the additional material may be selected from additional filler, additional elastomer, a second masterbatch, oil and other additives. In certain preferred embodiments, the continuous compounder dries the masterbatch. In certain preferred embodiments, the continuous compounder controls the Mooney Viscosity of the masterbatch.

In accordance with another aspect, a continuous flow method of producing elastomer composite includes the steps of feeding a continuous flow of first fluid including elastomer latex to a mixing zone of a coagulum reactor defining an elongate coagulum zone extending from the mixing zone to a discharge end; feeding a continuous flow of second fluid having particulate filler under pressure to the mixing zone of the coagulum reactor to form a mixture with the elastomer latex, the mixture passing as a continuous flow to the discharge end and the particulate filler being effective to coagulate the elastomer latex, wherein mixing of the first fluid and the second fluid within the mixing zone is sufficiently energetic to substantially completely coagulate the elastomer latex with the particulate filler prior to the discharge end; discharging a substantially continuous flow of elastomer composite from the discharge end of the coagulum reactor; feeding the substantially continuous flow of elastomer composite to a feed port of a continuous compounder having multiple parallel rotors axially oriented in an elongate processing chamber; processing the elastomer composite through the processing chamber of the continuous compounder by controlled operation of the rotors; and discharging the elastomer composite from a discharge orifice of the continuous compounder. In certain preferred embodiments, the method also includes the step of processing the elastomer composite from the discharge orifice of the continuous compounder through an open mill.

In accordance with another aspect, an apparatus for producing elastomer composite of particulate filler dispersed in elastomer has a coagulum reactor defining a mixing zone and an elongate coagulum zone extending from the mixing zone to a discharge end; latex feed means for feeding elastomer latex fluid continuously to the mixing zone; filler feed means for feeding particulate filler fluid as a continuous jet into the mixing zone to form a mixture with the elastomer latex fluid traveling from the mixing zone to the discharge end of the coagulum zone, wherein the distance between the mixing zone and the discharge end is sufficient to permit substantially complete coagulation of the elastomer latex prior to the discharge end; and a continuous compounder having a feed port operatively connected to the discharge end of the coagulum zone for receiving the coagulated mixture of elastomer latex and particulate filler, a discharge orifice, an elongate processing chamber, and a plurality of rotors axially oriented within the processing chamber. In certain preferred embodiments, the apparatus further has conveying means for conveying a substantially continuous flow of elastomer composite from the discharge end of the coagulum zone to the feed port of the continuous compounder.

In accordance with another aspect, an elastomer composite has substantially coagulated elastomer in which particulate filler has been dispersed by feeding a continuous flow of first fluid having elastomer latex to a mixing zone of a coagulum reactor defining an elongate coagulum zone extending from the mixing zone to a discharge end; feeding a continuous flow of second fluid having particulate filler under pressure to the mixing zone of the coagulum reactor to form a mixture with the elastomer latex, the mixture passing as a continuous flow to the discharge end, and the particulate filler being effective to coagulate the elastomer latex, wherein mixing of the first fluid and the second fluid within the mixing zone is sufficiently energetic to substantially completely coagulate the elastomer latex with the particulate filler prior to the discharge end; discharging a substantially continuous flow of elastomer composite from the discharge end of the coagulum reactor; feeding the elastomer composite from the discharge end of the coagulum reactor to a continuous compounder having multiple parallel elongate rotors axially oriented in an elongate processing chamber; processing the masterbatch through the processing chamber of the continuous compounder by controlled operation of the rotors; and discharging the masterbatch from a discharge orifice of the continuous compounder.

In accordance with another aspect, masterbatch is processed in a continuous compounder as described above along with the addition of other materials. Specifically, the additional materials may be additional filler; additional elastomers; additional masterbatch, comprising elastomer composite and carbon black or other filler; any of various known additives used in elastomer composites, such as antioxidants, antiozonants, plasticizers, processing aids (e.g., liquid polymers, oils and the like), resins, flame-retardants, extender oils, lubricants, and a mixture of any of them; and a vulcanization system, or a mixture of any of these.

In accordance with another aspect, a method for preparing elastomer masterbatch comprises feeding simultaneously a particulate filler fluid and an elastomer latex fluid to a mixing zone of a coagulum reactor, followed by further processing in a de-watering extruder and continuous compounder, as disclosed above. Most preferably the coagulum reactor, de-watering extruder and the continuous compounder operate together in a continuous flow production line. A coagulum zone of the coagulum reactor extends from the mixing zone, preferably progressively increasing in cross-sectional area in the downstream direction from an entry end to a discharge end. The elastomer latex may be either natural or synthetic and the particulate filler fluid comprises carbon black or other particulate filler effective to coagulate the latex. The particulate filler fluid is fed to the mixing zone preferably as a continuous, high velocity jet of injected fluid, while the latex fluid is fed at low velocity. The velocity, flow rate and particulate concentration of the particulate filler fluid are sufficient to cause high shear mixing with the latex fluid and flow turbulence of the mixture within at least an upstream portion of the coagulum zone, so as to substantially completely coagulate the elastomer latex with the particulate filler prior to the discharge end. Substantially complete coagulation is thus achieved, in accordance with preferred embodiments, without the need of employing an acid or salt coagulation agent. The coagulum reactor is discussed in detail in commonly owned and copending U.S. application Ser. No. 08/823,411 and in Published PCT Application Serial Number PCT/US97/05276, both of which are incorporated herein by reference. The masterbatch from the coagulum reactor is fed through a de-watering extruder to remove the bulk of the water from the masterbatch and then into a feed port of the continuous compounder disclosed above, preferably in a continuous flow stream from the coagulum reactor. The continuous compounder dries the elastomer masterbatch, provides control over the Mooney Viscosity of the elastomer masterbatch and, in certain preferred embodiments, control over other characteristics and performance properties of the masterbatch via manipulation of continuous compounder operating parameters, including rotor speed, throughput rate, discharge orifice opening size, discharge orifice temperature and processing chamber temperature. The masterbatch may, in accordance with certain preferred embodiments, optionally be further processed after the continuous compounder by an open mill to further control the Mooney Viscosity of the masterbatch. This is especially advantageous, since the elastomer masterbatch produced by the coagulum reactor may have a Mooney Viscosity which is too high for use in certain applications. Further processing of the masterbatch by the continuous compounder and the open mill is now found to provide excellent product control to achieve a desired Mooney Viscosity and moisture level.

In especially preferred embodiments, the above disclosed de-watering extruder is connected to the coagulum reactor by a conveyor or conduit for carrying masterbatch from the coagulum reactor to the de-watering extruder, and the continuous compounder is directly downstream of the de-watering extruder, such that the masterbatch is produced and treated in a continuous flow process. Thus, a continuous process line is created for the formation and treatment of elastomer masterbatch, which provides for significantly enhanced economies of production. Use of the continuous compounder with a de-watering extruder and coagulum reactor in a continuous process line can facilitate controlling and changing operating parameters of the masterbatch production and treatment line without interrupting the continuous process line.

In accordance with an apparatus aspect, a coagulum reactor, de-watering extruder and continuous compounder described above are coupled in a masterbatch production and treatment line. In accordance with certain preferred embodiments, an open mill is provided to cool the elastomer masterbatch and further control its Mooney Viscosity after it passes through the continuous compounder.

In accordance with another apparatus aspect, means are provided for feeding elastomer latex fluid to the mixing zone of the aforesaid coagulum reactor, preferably under low pressure, substantially laminar type flow conditions, and means are provided for simultaneously feeding particulate filler fluid to the mixing zone under pressure sufficient to create a jet of adequate velocity or kinetic energy to entrain the elastomer latex, as described above, and achieve coagulation before the product flowing downstream from the mixing zone reaches the discharge end of the coagulum reactor. In accordance with certain preferred embodiments described in detail below, means for feeding the elastomer latex fluid and separate means for feeding the particulate filler fluid each may comprise a feed channel in a mixing head integral with a substantially tubular member defining the coagulum zone. The mixing zone may be provided at the junction of such feed channels within the mixing head. In accordance with certain preferred embodiments, the mixing zone is simply a coaxial extension of the coagulum zone. Progressive increase in the cross-sectional area of the coagulum reactor is continuous in certain preferred embodiments and is step-wise in other preferred embodiments. A de-watering extruder and continuous compounder are positioned downstream of the coagulum reactor to further process the elastomer masterbatch, providing drying and control of the Mooney Viscosity and other physical properties and performance characteristics of the elastomer masterbatch. In certain preferred embodiments, an open mill may be coupled to the discharge orifice of the continuous compounder, either directly or via a conveyor or other conduit, to provide yet further treatment of the elastomer masterbatch. Additional optional and preferred features of the apparatus disclosed here for continuous flow production of elastomer masterbatch are discussed in the detailed description below.

In accordance with yet another aspect, elastomer composites are provided as a product of the process or apparatus disclosed above. In accordance with preferred embodiments, novel elastomer composites are provided having macro-dispersion level of the particulate filler, molecular weight of the elastomer, particulate loading level, choice of particulate filler (including, for example, carbon black fillers of exceptionally high surface area and low structure), controlled Mooney Viscosity and/or other physical properties or performance characteristics not previously achieved. Additionally, a suitable balance can be obtained between the molecular weight and bound rubber of the masterbatch for a given Mooney Viscosity. In that regard, the methods and apparatus disclosed here can achieve excellent macro-dispersion, even of certain fillers, such as carbon blacks having a structure to surface area ratio DBP:CTAB less than 1.2 and even less than 1, in elastomers such as natural rubber, while minimizing degradation of the molecular weight of the elastomer and highly controlled Mooney Viscosity. In accordance with yet other aspects of the invention, intermediate products are provided as well as final products which are formed of the elastomer composites produced by the method or apparatus disclosed here, e.g., tires and tire components. Further examples of such final products are listed below.

These and other aspects and advantages of various embodiments of the invention will be further understood in view of the following detailed discussion of certain preferred embodiments.

BRIEF DESCRIPTION OF THE DRAWINGS

The following discussion of certain preferred embodiments will make reference to the appended drawings wherein.

Figure 1:
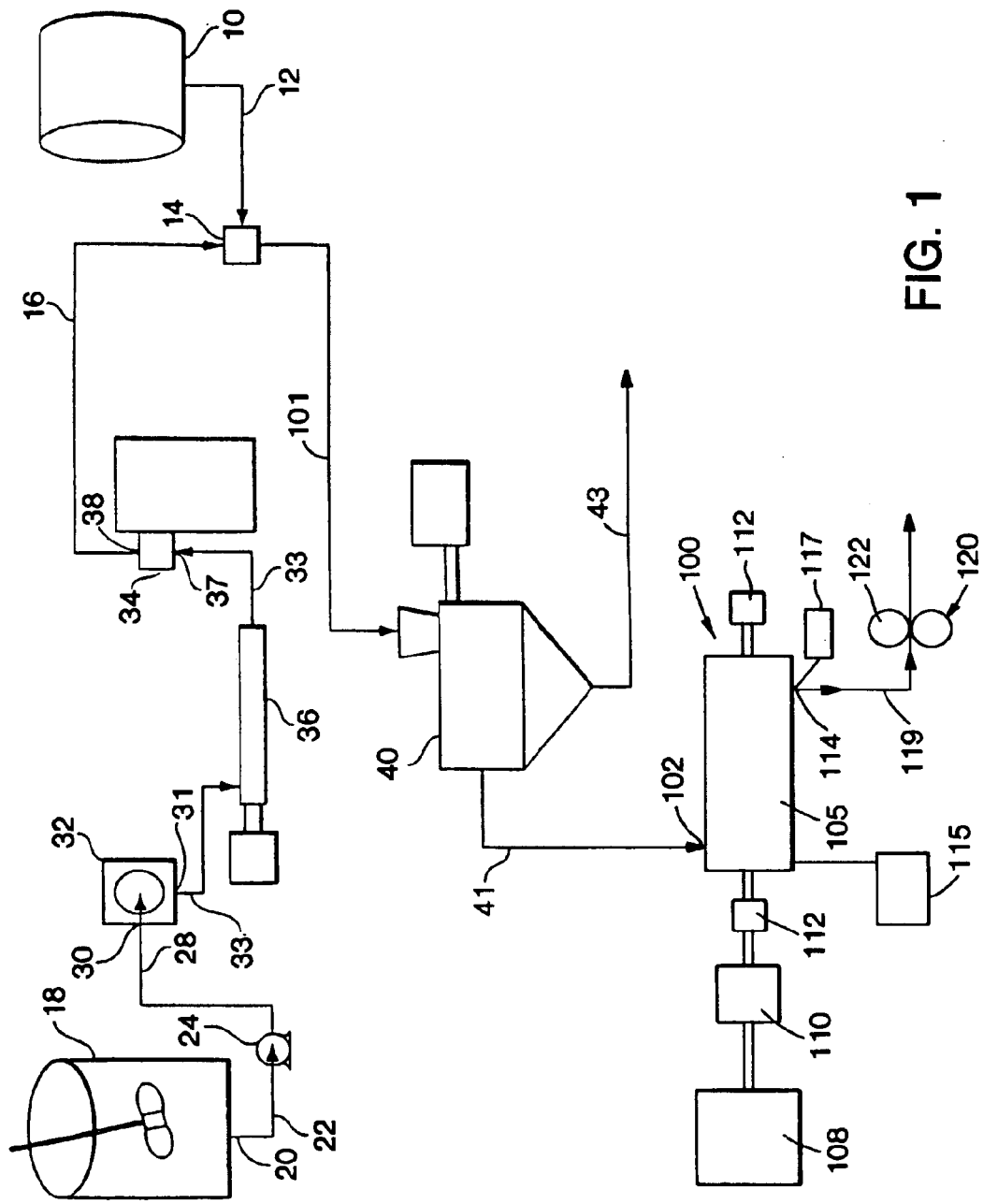
FIG. 1 is a schematic flow chart illustration of the apparatus and method for preparing elastomer masterbatch in accordance with certain preferred embodiments of the present invention.

It should be understood that the appended drawings are not necessarily precisely to scale. Certain features may have been enlarged or reduced for convenience or clarity of illustration. Directional references used in the following discussion are based on the orientation of components illustrated in the drawings unless otherwise stated or otherwise clear from the context. In general, apparatus in accordance with different embodiments of the invention can be employed in various arrangements. It will be within the ability of those skilled in the art, given the benefit of the present disclosure, to determine appropriate dimensions and orientations for apparatus of the invention employing routine technical skills and taking into account well-known factors particular to the intended application, such as desired production volumes, material selection, duty cycle, and the like. Reference numbers used in one drawing may be used in other drawings for the same feature or element.

DETAILED DESCRIPTION OF CERTAIN PREFERRED EMBODIMENTS

The following is a detailed description of certain preferred embodiments of the present invention and is not intended to limit the present invention to the embodiments described below.

By virtue of the method and apparatus disclosed here, wet elastomer masterbatch can be processed to remove moisture, reduce its Mooney Viscosity, and/or to compound it with other materials. Preferably the masterbatch is produced in a continuous flow process involving mixture of elastomer latex and particulate filler fluids at turbulence levels and flow control conditions sufficient to achieve coagulation even without use of traditional coagulating agents. In fact, it will be immediately recognized to be of great commercial benefit that elastomer masterbatch crumb is achieved, that is, coagulated latex is achieved, without the need for either intensive dry mastication of elastomer with filler or exposing a liquid latex/particulate composition to a stream or tank of coagulant. Thus, in routine commercial implementation the cost and complexity of employing acid coagulation solutions can be avoided. Prior techniques involving premixing of latex and particulate, such as in the above-mentioned Heller et al. patent and Hagopian et al. patent do not even recognize the possibility of achieving coagulation without exposing the latex/particulate mixture to the usual coagulant solution with its attendant cost and waste disposal disadvantages. Elastomer masterbatch produced by this continuous flow process may have a Mooney Viscosity and moisture level which are too high for certain applications. The use of a de-watering extruder and continuous compounder, described in greater detail below, dries the elastomer masterbatch and controls its Mooney Viscosity, while optimizing molecular weight and bound rubber.

Feed rates of latex fluid and particulate filler fluid to the mixing zone of the coagulum reactor can be precisely metered to achieve high yield rates, with little free latex and little undispersed filler in the product crumb at the discharge end of the coagulum reactor. Without wishing to be bound by theory, it presently is understood that a quasi-mono-phase system is established in the mixing zone except that coagulum solids are being formed there and/or downstream thereof in the coagulum zone. Extremely high feed velocity of the particulate filler fluid into the mixing zone of the coagulum reactor and velocity differential relative the latex fluid feed are believed to be significant in achieving sufficient turbulence, i.e., sufficiently energetic shear of the latex by the impact of the particulate filler fluid jet for thorough mixing and dispersion of the particulate into the latex fluid and coagulation. High mixing energies yield product masterbatch crumb with excellent dispersion, together with controlled product delivery. The coagulum is created and then formed into a desirable extrudate.

Certain preferred embodiments are discussed below, of methods and apparatus for producing the novel elastomer composites disclosed here. While various preferred embodiments of the invention can employ a variety of different fillers and elastomers, certain portions of the following detailed description of method and apparatus aspects of the invention will, for convenience, describe their use primarily in producing masterbatch comprising natural rubber and carbon black. It will be within the ability of those skilled in the art, given the benefit of this disclosure, to employ the method and apparatus disclosed here in accordance with the principles of operation discussed below to produce masterbatch comprising a number of alternative or additional elastomers, fillers and other materials. In brief, such methods for preparing elastomer masterbatch involve feeding simultaneously a slurry of carbon black or other filler and a natural rubber latex fluid or other suitable elastomer fluid to a mixing zone of a coagulum reactor. A coagulum zone extends from the mixing zone, preferably progressively increasing in cross-sectional area in the downstream direction from an entry end to a discharge end. The slurry is fed to the mixing zone preferably as a continuous, high velocity jet of injected fluid, while the natural rubber latex fluid is fed at relatively low velocity. The high velocity, flow rate and particulate concentration of the filler slurry are sufficient to cause mixture and high shear of the latex fluid, flow turbulence of the mixture within at least an upstream portion of the coagulum zone, and substantially completely coagulate the elastomer latex prior to the discharge end. Substantially complete coagulation can thus be achieved, in accordance with preferred embodiments, without the need of employing an acid or salt coagulation agent. The preferred continuous flow method of producing the elastomer composites comprises the continuous and simultaneous feeding of the latex fluid and filler slurry to the mixing zone of the coagulum reactor, establishing a continuous, semi-confined flow of a mixture of the latex and filler slurry in the coagulum zone. Elastomer composite crumb in the form of "worms" or globules are discharged from the discharge end of the coagulum reactor as a substantially constant flow concurrently with the on-going feeding of the latex and carbon black slurry streams into the mixing zone of the coagulum reactor. Notably, the plug-type flow and atmospheric or near atmospheric pressure conditions at the discharge end of the coagulum reactor are highly advantageous in facilitating control and collection of the elastomer composite product, such as for immediate or subsequent further processing steps. Feed rates of the natural rubber latex fluid and carbon black slurry to the mixing zone of the coagulum reactor can be precisely metered to achieve high yield rates, with little free latex and little undispersed carbon black in the product crumb at the discharge end of the coagulum reactor. Without wishing to be bound by theory, it presently is understood that a quasi-mono-phase system is established in the mixing zone except that coagulum solids are being formed there and/or downstream thereof in the coagulum zone. Extremely high feed velocity of the carbon black slurry into the mixing zone of the coagulum reactor and velocity differential relative the natural rubber latex fluid feed are believed to be significant in achieving sufficient turbulence, i.e., sufficiently energetic shear of the latex by the impact of the particulate filler fluid jet, for thorough mixing and dispersion of the particulate into the latex fluid and coagulation. High mixing energies yield the novel product with excellent macro-dispersion, together with controlled product delivery. The coagulum is created and then formed into a desirable extrudate. The bulk of the water in the extrudate is then preferably removed by a de-watering extruder (e.g., from approximately 80% water content to approximately 15% to 25% water content) and further processed by a continuous compounder to dry the elastomer masterbatch to a desired level (e.g., below approximately 1% water content) and control its Mooney Viscosity. In certain preferred embodiments, the masterbatch is then processed by an open mill to further control the Mooney Viscosity of the elastomer masterbatch.

The aforesaid preferred apparatus and techniques for producing the elastomer composites disclosed here are discussed in conjunction with the appended drawings, wherein a continuous flow method of producing elastomer masterbatch employs a continuous, semi-confined flow of elastomer latex, for example, natural rubber latex (field latex or concentrate) mixed with a filler slurry, for example, an aqueous slurry of carbon black, in a coagulum reactor forming an elongate coagulum zone which extends, preferably with progressively increasing cross-sectional area, from an entry end to a discharge end. The term "semi-confined" flow refers to a highly advantageous feature. As used here the term is intended to mean that the flow path followed by the mixed latex fluid and filler slurry within the coagulum reactor is closed or substantially closed upstream of the mixing zone and is open at the opposite, downstream end of the coagulum reactor, that is, at the discharge end of the coagulum reactor. Turbulence conditions in the upstream portion of the coagulum zone are maintained in on-going, at least quasi-steady state fashion concurrently with substantially plug flow-type conditions at the open discharge end of the coagulum reactor. The discharge end is "open" at least in the sense that it permits discharge of coagulum, generally at or near atmospheric pressure and, typically, by simple gravity drop (optionally within a shrouded or screened flow path) into suitable collection means, such as a hopper connected to a de-watering extruder. Thus, the semi-confined flow results in a turbulence gradient extending axially or longitudinally within at least a portion of the coagulum reactor. Without wishing to be bound by theory, it presently is understood that the coagulum zone is significant in permitting high turbulence mixing and coagulation in an upstream portion of the coagulum reactor, together with substantially plug-type discharge flow of a solid product at the discharge end. Injection of the carbon black or other filler slurry as a continuous jet into the mixing zone occurs in on-going fashion simultaneously with ease of collection of the elastomer masterbatch crumb discharged under substantially plug-type flow conditions and generally ambient pressure at the discharge end of the coagulum reactor. Similarly, axial velocities of the slurry through the slurry nozzle into the mixing zone and, typically, at the upstream end of the coagulum zone are substantially higher than at the discharge end. Axial velocity of the slurry will typically be several hundred feet per second as it enters the mixing zone, preferably from a small bore, axially oriented feed tube in accordance with preferred embodiments discussed below. The axial velocity of the resultant flow at the entry end of a coagulum reactor with expanding cross-sectional area in a typical application may be, for example, 5 to 20 feet per second, and more usually 7 to 15 feet per second. At the discharge end, in contrast again, axial velocity of the masterbatch crumb product being discharged there will in a typical application be approximately 1 to 10 feet per second, and more generally 2 to 5 feet per second. Thus, the aforesaid semi-confined turbulent flow achieves the highly significant advantage that natural rubber or other elastomer latex is coagulated by mixture with carbon black or other filler even in the absence of subsequent treatment in a stream or tank of acid, salt or other coagulant solution, with controlled, preferably quasi-molded product delivery from the coagulum reactor for subsequent processing.

It should also be recognized in this regard that the turbulence of the flow lessens along the coagulum reactor toward the discharge end. Substantial plug flow of a solid product is achieved prior to the discharge end, dependent upon such factors as percent of capacity utilization, selection of materials and the like. Reference here to the flow being substantially plug flow at or before the discharge end of the coagulum reactor should be understood in light of the fact that the flow at the discharge end is composed primarily or entirely of masterbatch crumb, that is, globules or "worms"

of coagulated elastomer masterbatch. The crumb is typically quasi-molded to the inside shape of the coagulum zone at the point along the coagulum zone at which flow became substantially plug flow. The ever-advancing mass of "worms" or globules advantageously have plug-type flow in the sense that they are traveling generally or primarily axially toward the discharge end and at any point in time in a given cross-section of the coagulum zone near the discharge end have a fairly uniform velocity, such that they are readily collected and controlled for further processing. Thus, the fluid phase mixing aspect disclosed here can advantageously be carried out at steady state or quasi-steady state conditions, resulting in high levels of product uniformity.

A preferred embodiment of the method and apparatus disclosed here is illustrated schematically in FIG. 1. Those skilled in the art will recognize that the various aspects of system configuration, component selection and the like will depend to some extent on the particular characteristics of the intended application. Thus, for example, such factors as maximum system through-put capacity and material selection flexibility will influence the size and layout of system components. In general, such considerations will be well within the ability of those skilled in the art given the benefit of the present disclosure. The system illustrated in FIG. 1 is seen to include means for feeding natural rubber latex or other elastomer latex fluid at low pressure and low velocity continuously to a mixing zone of a coagulum reactor. More particularly, a latex pressure tank 10 is shown, to hold the feed supply of latex under pressure. Alternatively, a latex storage tank can be used, equipped with a peristaltic pump or series of pumps or other suitable feed means adapted to hold elastomer latex fluid to be fed via feed line 12 to a mixing zone of a coagulum reactor 14. Latex fluid in tank 10 may be held under air or nitrogen pressure or the like, such that the latex fluid is fed to the mixing zone at a line pressure of preferably less than 10 psig, more preferably about 2–8 psig, and typically about 5 psig. The latex feed pressure and the flow lines, connections, etc., of the latex feed means should be arranged to maintain shear in the flowing latex fluid as low as reasonably possible. Preferably all flow lines, for example, are smooth, with only large radius turns, if any, and smooth or flared line-to-line interconnections. The pressure is selected to yield the desired flow velocity into the mixing zone; an example of a useful flow velocity is no more than about 12 feet per second.

Suitable elastomer latex fluids include both natural and synthetic elastomer latices and latex blends. The latex must, of course, be suitable for coagulation by the selected particulate filler and must be suitable for the intended purpose or application of the final rubber product. It will be within the ability of those skilled in the art to select suitable elastomer latex or a suitable blend of elastomer latices for use in the methods and apparatus disclosed here, given the benefit of this disclosure. Exemplary elastomers include, but are not limited to, rubbers, polymers (e.g., homopolymers, copolymers and/or terpolymers) of 1,3-butadiene, styrene, isoprene, isobutylene, 2,3-dimethyl-1,3-butadiene, acrylonitrile, ethylene, and propylene and the like. The elastomer may have a glass transition temperature (Tg) as measured by differential scanning calorimetry (DSC) ranging from about −120° C. to about 0° C. Examples include, but are not limited to, styrene-butadiene rubber (SBR), natural rubber and its derivatives such as chlorinated rubber, polybutadiene, polyisoprene, poly(stryeneco-butadiene) and the oil extended derivatives of any of them. Blends of any of the foregoing may also be used. The latex may be in an aqueous carrier liquid. Alternatively, the liquid carrier may be a hydrocarbon solvent. In any event, the elastomer latex fluid must be suitable for controlled continuous feed at appropriate velocity, pressure and concentration into the mixing zone. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, butene-1 and pentene-1. As noted further below, the rubber compositions of the present invention can contain, in addition to the elastomer and filler, a coupling agent, and optionally, various processing aids, oil extenders and antidegradents.

In that regard, it should be understood that the elastomer composites disclosed here include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

Where the elastomer latex comprises natural rubber latex, the natural rubber latex can comprise field latex or latex concentrate (produced, for example, by evaporation, centrifugation or creaming). The natural rubber latex must, of course, be suitable for coagulation by the carbon black. The latex is provided typically in an aqueous carrier liquid. Alternatively, the liquid carrier may be a hydrocarbon solvent. In any event, the natural rubber latex fluid must be suitable for controlled continuous feed at appropriate velocity, pressure and concentration into the mixing zone. The well known instability of natural rubber latex is advantageously accommodated, in that it is subjected to relatively low pressure and low shear throughout the system until it is entrained into the aforesaid semi-confined turbulent flow upon encountering the extraordinarily high velocity and kinetic energy of the carbon black slurry in the mixing zone. In certain preferred embodiments, for example, the natural rubber is fed to the mixing zone at a pressure of about 5 psig, at a feed velocity in the range of about 3–12 ft. per second, more preferably about 4–6 ft. per second. Selection of a suitable latex or blend of latices will be well within the ability of those skilled in the art given the benefit of the present disclosure and the knowledge of selection criteria generally well recognized in the industry.

The particulate filler fluid, for example, carbon black slurry, is fed to the mixing zone at the entry end of coagulum reactor 14 via feed line 16. The slurry may comprise any suitable filler in a suitable carrier fluid. Selection of the carrier fluid will depend largely upon the choice of particulate filler and upon system parameters. Both aqueous and non-aqueous liquids may be used, with water being preferred in many embodiments in view of its cost, availability and suitability of use in the production of carbon black and certain other filler slurries.

When a carbon black filler is used, selection of the carbon black will depend largely upon the intended use of the elastomer masterbatch product. Optionally, the carbon black filler can include also any material which can be slurried and fed to the mixing zone in accordance with the principles disclosed here. Other suitable particulate fillers include, for example, conductive fillers, reinforcing fillers, fillers comprising short fibers (typically having an L/D aspect ratio less than 40), flakes, etc. Thus, exemplary particulate fillers which can be employed in producing elastomer masterbatch in accordance with the methods and apparatus disclosed here, are carbon black, fumed silica, precipitated silica, coated carbon black, chemically functionalized carbon blacks, such as those having attached organic groups, and silicon-treated carbon black, either alone or in combination with each other. Suitable chemically functionalized carbon blacks include those disclosed in International Application No. PCT/US95/16194 (WO 9618688), the disclosure of which is hereby incorporated by reference. In silicon-treated carbon black, a silicon containing species such as an oxide or carbide of silicon, is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. As discussed elsewhere herein, carbon black aggregates may be modified by depositing silicon-containing species, such as silica, on at least a portion of the surface of the carbon black aggregates. The result may be described as silicon-coated carbon blacks. The materials described herein as silicon-treated carbon blacks are not carbon black aggregates which have been coated or otherwise modified, but actually represent a different kind of aggregate. In the silicon-treated carbon blacks, the aggregates contain two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate. In this process, an existing aggregate is treated so as to deposit or coat silica (as well as possibly other silicon-containing species) on at least a portion of the surface of the aggregate. For example, an aqueous sodium silicate solution may be used to deposit amorphous silica on the surface of carbon black aggregates in an aqueous slurry at high pH, such as 6 or higher, as discussed in Japanese Unexamined Laid-Open (Kokai) Publication No. 63-63755. More specifically, carbon black may be dispersed in water to obtain an aqueous slurry consisting, for example, of about 5% by weight carbon black and 95% by weight water. The slurry is heated to above about 70° C., such as to 85–95° C., and the pH adjusted to above 6, such as to a range of 10–11, with an alkali solution. A separate preparation is made of sodium silicate solution, containing the amount of silica which is desired to be deposited on the carbon black, and an acid solution to bring the sodium silicate solution to a neutral pH. The sodium silicate and acid solutions are added dropwise to the slurry, which is maintained at its starting pH value with acid or alkali solution as appropriate. The temperature of the solution is also maintained. A suggested rate for addition of the sodium silicate solution is to calibrate the dropwise addition to add about 3 weight percent silicic acid, with respect to the total amount of carbon black, per hour. The slurry should be stirred during the addition, and after its completion for from several minutes (such as 30) to a few hours (i.e., 2–3). In contrast, silicon-treated carbon blacks may be obtained by manufacturing carbon black in the presence of volatizable silicon-containing compounds. Such carbon blacks are preferably produced in a modular or "staged" furnace carbon black reactor having a combustion zone followed by a zone of converging diameter, a feed stock injection zone with restricted diameter, and a reaction zone. A quench zone is located downstream of the reaction zone. Typically, a quenching fluid, generally water, is sprayed into the stream of newly formed carbon black particles flowing from the reaction zone. In producing silicon-treated carbon black, the aforesaid volatizable silicon-containing compound is introduced into the carbon black reactor at a point upstream of the quench zone. Useful compounds are volatizable compounds at carbon black reactor temperatures. Examples include, but are not limited to, silicates such as tetraethoxy orthosilicate (TEDS) and tetramethoxy orthosilicate, silanes such as, tetrachloro silane, and trichloro methylsilane; and volatile silicone polymers such as octamethylcyclotetrasiloxane (OMTS). The flow rate of the volatilizable compound will determine the weight percent of silicon in the treated carbon black. The weight percent of silicon in the treated carbon black typically ranges from about 0.1 percent to 25 percent, preferably about 0.5 percent to about 10 percent, and more preferably about 2 percent to about 6 percent. The volatizable compound may be pre-mixed with the carbon black-forming feed stock and introduced with the feed stock into the reaction zone. Alternatively, the volatizable compound may be introduced to the reaction zone separately, either upstream or downstream from the feed stock injection point.

As noted above, additives may be used, and in this regard coupling agents useful for coupling silica or carbon black should be expected to be useful with the silicon-treated carbon blacks. Carbon blacks and numerous other suitable particulate fillers are commercially available and are known to those skilled in the art.

Selection of the particulate filler or mixture of particulate fillers will depend largely upon the intended use of the elastomer masterbatch product. As used here, particulate filler can include any material which can be slurried and fed to the mixing zone in accordance with the principles disclosed here. Suitable particulate fillers include, for example, conductive fillers, reinforcing fillers, fillers comprising short fibers (typically having an L/D aspect ratio less than 40), flakes, etc. In addition to the carbon black and silica-type fillers mentioned above, fillers can be formed of clay, glass, polymer, such as aramid fiber, etc. It will be within the ability of those skilled in the art to select suitable particulate fillers for use in the method and apparatus disclosed here given the benefit of the present disclosure, and it is expected that any filler suitable for use in elastomer compositions may be incorporated into the elastomer composites using the teachings of the present disclosure. Of course, blends of the various particulate fillers discussed herein may also be used.

Preferred embodiments of the invention consistent with FIG. 1 are especially well adapted to preparation of particulate filler fluid comprising aqueous slurries of carbon black. In accordance with known principles, it will be understood that carbon blacks having lower surface area per unit weight must be used in higher concentration in the particulate slurry to achieve the same coagulation efficacy as lower concentrations of carbon black having higher surface area per unit weight. Agitated mixing tank 18 receives water and carbon black, e.g., optionally pelletized carbon black, to prepare an initial mixture fluid. Such mixture fluid passes through discharge orifice 20 into fluid line 22 equipped with pumping means 24, such as a diaphragm pump or the like. Line 28 passes the mixture fluid to colloid mill 32, or alternatively a pipeline grinder or the like, through intake port 30. The carbon black is dispersed in the aqueous carrier liquid to form a dispersion fluid which is passed through outlet port 31 and fluid line 33 to a homogenizer 34. Pumping means 36, preferably comprising a progressing cavity pump or the like is provided in line 33. Homogenizer 34 more finely disperses the carbon black in the carrier liquid to form the carbon black slurry which is fed to the mixing zone of the coagulum reactor 14. It has an inlet port 37 in fluid communication with line 33 from the colloid mill 32. The homogenizer 34 may preferably comprise, for example, a Microfluidizer® system commercially available from Microfluidics International Corporation (Newton, Mass., USA). Also suitable are homogenizers such as models MS18, MS45 and MC120 Series homogenizers available from the APV Homogenizer Division of APV Gaulin, Inc. (Wilmington, Mass., USA). Other suitable homogenizers are commercially available and will be apparent to those skilled in the art given the benefit of the present disclosure. Typically, carbon black in water prepared in accordance with the above described system will have at least about 90% agglomerates less than about 30 microns, more preferably at least about 90% agglomerates less than about 20 microns in size. Preferably, the carbon black is broken down to an average size of 5–15 microns, e.g., about 9 microns. Exit port 38 passes the carbon black slurry from the homogenizer to the mixing zone through feed line 16. The slurry may reach 10,000 to 15,000 psi in the homogenizer step and exit the homogenizer at about 600 psi or more. Preferably, a high carbon black content is used to reduce the task of removing excess water or other carrier. Typically, about 10 to 30 weight percent carbon black is preferred. Those skilled in the art will recognize, given the benefit of this disclosure, that the carbon black content (in weight percent) of the slurry and the slurry flow rate to the mixing zone should be coordinated with the natural rubber latex flow rate to the mixing zone to achieve a desired carbon black content (in phr) in the masterbatch. The carbon black content will be selected in accordance with known principles to achieve material characteristics and performance properties suited to the intended application of the product. Typically, for example, carbon blacks of CTAB value 10 or more are used in sufficient amount to achieve carbon black content in the masterbatch of at least about 30 phr.

The slurry preferably is used in masterbatch production immediately upon being prepared. Fluid conduits carrying the slurry and any optional holding tanks and the like, should establish or maintain conditions which substantially preserve the dispersion of the carbon black in the slurry. That is, substantial reaglomeration or settling out of the particulate filler in the slurry should be prevented or reduced to the extent reasonably practical. Preferably all flow lines, for example, are smooth, with smooth line-to-line interconnections. Optionally, an accumulator is used between the homogenizer and the mixing zone to reduce fluctuations in pressure or velocity of the slurry at the slurry nozzle tip in the mixing zone.

Natural rubber latex fluid or other elastomer latex fluid passed to the mixing zone via feed line 12 and carbon black slurry fed to the mixing zone via feed line 16 under proper process parameters as discussed above, can produce a novel elastomer composite, specifically, elastomer masterbatch crumb. Means may also be provided for incorporating various additives into the elastomer masterbatch. An additive fluid comprising one or more additives may be fed to the mixing zone as a separate feed stream. One or more additives also may be pre-mixed, if suitable, with the carbon black slurry or, more typically, with the elastomer latex fluid. Additives also can be mixed into the masterbatch subsequently, e.g., by dry mixing techniques. Numerous additives are well known to those skilled in the art and include, for example, antioxidants, antiozonants, plasticizers, processing aids (e.g., liquid polymers, oils and the like), resins, flame-retardants, extender oils, lubricants, and a mixture of any of them. The general use and selection of such additives is well known to those skilled in the art. Their use in the system disclosed here will be readily understood with the benefit of the present disclosure.

The mixing zone/coagulum zone assembly is discussed in more detail below. The elastomer masterbatch crumb is passed from the discharge end of coagulum reactor 14 to suitable drying and compounding apparatus. In the preferred embodiment of FIG. 1, the masterbatch crumb is passed first via conveying means 41 to a de-watering extruder 40. In routine preferred embodiments consistent with that illustrated in FIG. 1 producing natural rubber masterbatch with carbon black filler, the de-watering operation will typically reduce water content from about 70–80 weight percent, to about 15–25 weight percent. Water is discharged from de-watering extruder 40 via effluent stream 43. Suitable de-watering extruders are well known and commercially available from, for example, the French Oil Machinery Co. (Piqua, Ohio, USA).

The masterbatch is passed from de-watering extruder 40 via conveyor or simple gravity drop or other suitable means 101 to a continuous compounder 100 and then to an open mill 120. In routine preferred embodiments consistent with that illustrated in FIG. 1 producing natural rubber masterbatch with carbon black filler, the compounding and milling operation will typically reduce water content from about 15–25 weight percent, to less than 1 weight percent. In certain preferred embodiments, additives can be combined with the masterbatch in continuous compounder 100. Specifically, additives such as antioxidants, antiozonants, plasticizers, processing aids (e.g., liquid polymers, oils and the like), resins, flame-retardants, extender oils, lubricants, and a mixture of any of them, can be added in continuous compounder 100. In certain other preferred embodiments, additional elastomers can be combined with the masterbatch in continuous compounder 100 to produce elastomer blends. Exemplary elastomers include, but are not limited to, rubbers, polymers (e.g., homopolymers, copolymers and/or terpolymers) of 1,3-butadiene, styrene, isoprene, isobutylene, 2,3-dimethyl-1,3-butadiene, acrylonitrile, ethylene, and propylene and the like. Continuous compounder 100 dries the masterbatch, masticates the masterbatch, provides control of its Mooney Viscosity and molecular weight, and minimizes the reduction of bound rubber. Suitable continuous compounders are well known and commercially available, including for example, the Unimix Continuous Mixer from Farrel Corporation of Ansonia, Conn.

Figure 8:
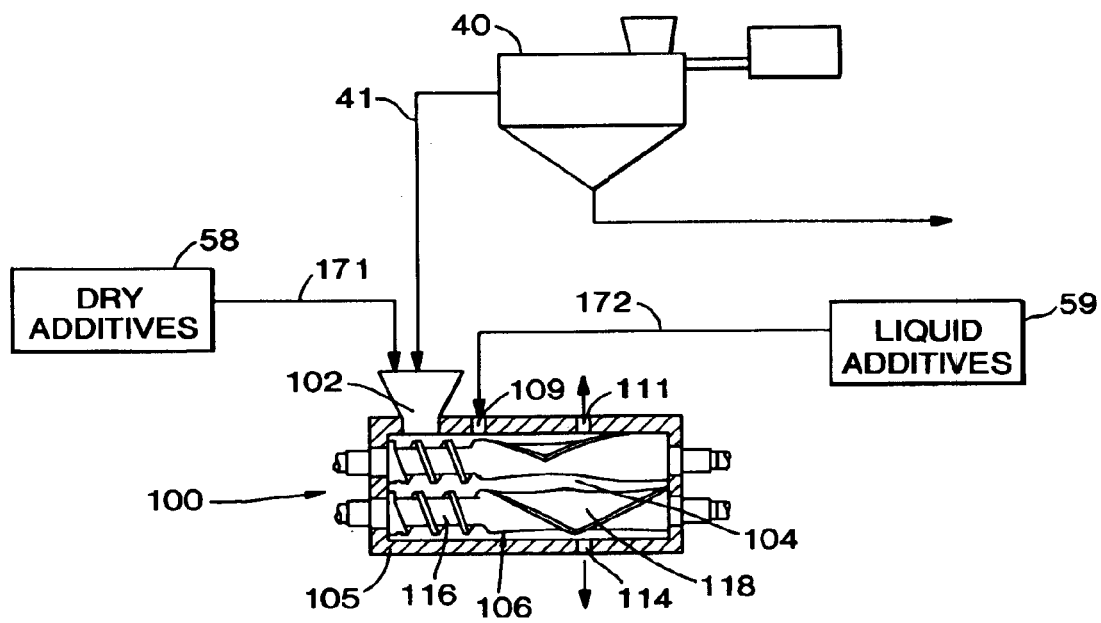
FIG. 8 is a schematic flowchart of a portion of an alternative embodiment of the masterbatch production line of FIG. 1 showing the continuous compounder of FIG. 1 in section.

As seen in FIGS. 1 and 8, the elastomer masterbatch is fed from coagulum reactor 14 to de-watering extruder 40 and then into feed port 102 formed in an elongate processing chamber 104 of continuous compounder 100. In certain preferred embodiments, feed port 102 is a hopper which facilitates a gravity drop of the elastomer masterbatch from de-watering extruder 40. Feed port 102 may also be fed via conveyor means such as a conveyor belt, conduit, pipe, or any other suitable means for transporting elastomer masterbatch. Processing chamber 104 is contained within housing 105 of continuous compounder 100. Elongate rotors 106 are seen to be parallel to each other and axially oriented in processing chamber 104. Rotors 106 are driven by motor 108 via gear reducer 110 and bearings 112. Rotors 106 are adapted in accordance with known designs for processing material axially through elongate processing chamber 104. As seen in FIG. 8, multiple rotors 106 are axially oriented in processing chamber 104. Rotors 106 preferably are segmented, with different segments optionally having different thread or screw configurations. In a preferred embodiment, processing chamber 104 houses two rotors 106 having different profiles. Suitable rotors 106 having different profiles include, for example, rotor model numbers 7 and 15 from Farrel Corporation of Ansonia Conn. In a preferred embodiment, rotors 106 contain a fluid which can be temperature controlled to provide heating and/or cooling to the elastomer masterbatch.

As seen in the embodiment illustrated in FIG. 8, each rotor 106 has a first segment 116 and a second segment 118. As the elastomer masterbatch passes through processing chamber 104, the rotors masticate the material, thereby mixing and drying the elastomer masterbatch. Port 109 is provided in processing chamber 104 for the addition of liquid additives. Dry materials can be added to the elastomer masterbatch via feed port 102. Vent 111 is provided in processing chamber 104 to allow moisture to vent as the elastomer masterbatch dries. The elastomer masterbatch exits processing chamber 104 via discharge orifice 114. A first temperature control device 115 provides heating and/or cooling to continuous compounder 100, typically with heated water. A second temperature control device 117 provides heating and/or cooling to discharge orifice 114, typically with chilled water. During a typical process, heat is added during startup, and then, once the process is fully underway, heating is discontinued and cooling is applied. During startup, heat is typically applied specifically to processing chamber 104 and discharge orifice 114, and during operation, cooling is applied specifically to feed port 102, processing chamber 104 and rotors 106. In a typical application, with a nominal throughput of 1000 lbs/hour of elastomer masterbatch, approximately 250,000–500,000 BTU/hr may be removed by cooling. As noted above, preferred embodiments of continuous compounder 100 dry the masterbatch as well as controlling its Mooney Viscosity and molecular weight, while not excessively reducing bound rubber. Certain preferred embodiments of continuous compounder 100 can reduce water content of the elastomer masterbatch from up to approximately 25 weight percent, to less than approximately 1 weight percent.

Control of the operating parameters of continuous compounder 100 allows control of the Mooney Viscosity, moisture content, molecular weight and bound rubber of the elastomer masterbatch. Such operating parameters include throughput rate of the continuous compounder, rotor speed, discharge orifice size and temperature, and processing chamber temperature.

In certain preferred embodiments, the elastomer masterbatch discharged from continuous compounder 100 is fed to open mill 120. The elastomer masterbatch is discharged as a length of extrudate and may be cut into smaller lengths prior to entering open mill 120. The elastomer masterbatch may optionally be fed to open mill 120 via conveyor 119. Conveyor 119 may be a conveyor belt, conduit, pipe, or other suitable means for transporting the elastomer masterbatch from continuous compounder 100 to open mill 120. Open mill 120 comprises a pair of rollers 122 which further control the Mooney Viscosity of the elastomer masterbatch. Rollers 122 may optionally be heated or cooled to provide enhanced operation of open mill 120. In certain embodiments, open mill 120 may reduce the temperature of the elastomer masterbatch approximately 100° C.

Figure 9:
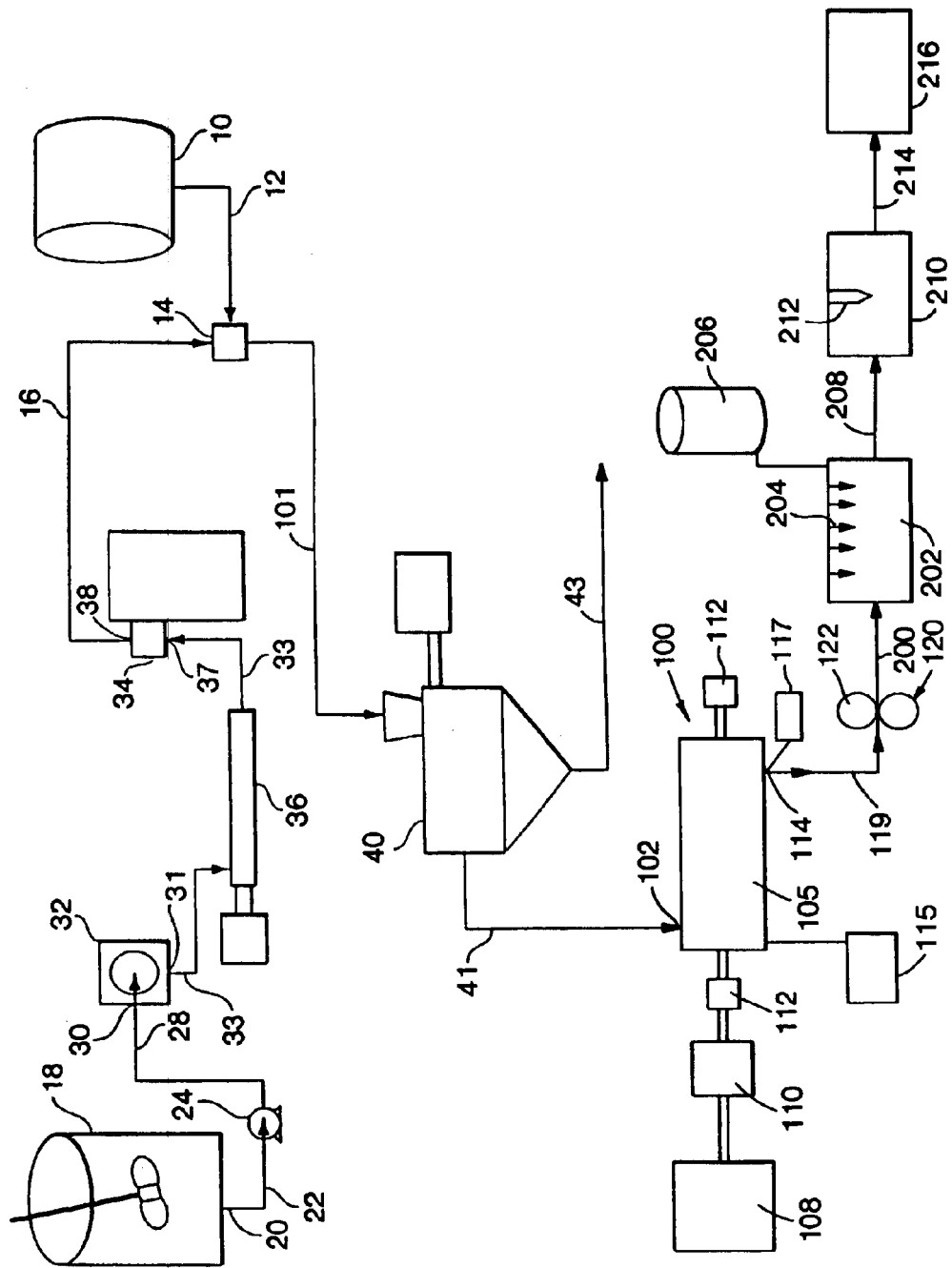
FIG. 9 is a schematic flowchart of a portion of an alternative embodiment of the apparatus and method of FIG. 1.

After exiting open mill 120, the elastomer masterbatch optionally may be fed by conveyor 200 to cooling system 202, as seen in FIG. 9. Cooling system 202 may include a cooling water spray 204, with its water being fed from cooling water tank 206 or other water source. The water from cooling water spray 204 may be sprayed directly onto the elastomer masterbatch. In certain embodiments, an anti-stick agent, e.g., Promol, manufactured by Hans W. Barbe, of Germany, and containing silicates and calcium stearate, may be added to the water spray or used in place of the water spray. Optionally, the elastomer masterbatch can then be fed by conveyor 208 to granulator 210. If cooling water spray 204 has been used, optionally an air knife 212 or other high pressure air blower or other suitable means can be used to remove any cooling water that did not evaporate from the elastomer masterbatch. The elastomer masterbatch can then optionally be fed by conveyor 214 to a baler 216, where the elastomer masterbatch can be baled more or less tightly or densely by varying the dwell time, that is, the pressure and time in baler 216, depending on its intended use. For example, a looser bale may be preferred for use in a Banbury mixer or the like.

As indicated above, the continuous compounder embodying the method and apparatus of the present invention is controllable so as to control the change in Mooney Viscosity, molecular weight, bound rubber, and drying of the masterbatch processed in the continuous compounder. The degree of change and final value of the these parameters will be selected in accordance with the intended use application of the resultant masterbatch. It will be within the ability of those skilled in the art, given the benefit of this disclosure, to select suitable rotor designs, and rotor operating conditions and parameters, to control the Mooney Viscosity, molecular weight, bound rubber and drying of the elastomer masterbatch processed in the continuous compounder. Typically, the Mooney Viscosity of masterbatch produced in the coagulum reactor is higher than desired for certain end use applications. The continuous compounder can advantageously reduce the Mooney Viscosity of the masterbatch to a selected lower value.

FIG. 8 schematically illustrates a subsystem 58 for introducing dry additives via conduit 171 and feed port 102 into continuous compounder 100. Also schematically illustrated in FIG. 8 is subsystem 59 for introducing liquid additives via conduit 172 and feed port 102 into continuous compounder 100. Conduits 171, 172, 173 may be, for example, pipes, conveyor belts, or other suitable means for transporting material from the respective subsystem to continuous compounder 100. Exemplary additives include, for example, filler (which may be the same as, or different from, the filler used in the coagulum reactor; exemplary fillers including silica and zinc oxide, with zinc oxide also acting as a curing agent), other elastomers, other or additional masterbatch, antioxidants, antiozonants, plasticizers, processing aids (e.g., stearic acid, which can also be used as a curing agent, liquid polymers, oils, waxes, and the like), resins, flame-retardants, extender oils, lubricants, and a mixture of any of them. The addition of elastomers can produce elastomer blends via continuous compounder 100. Exemplary elastomers include, but are not limited to, rubbers, polymers (e.g., homopolymers, copolymers and/or terpolymers) of 1,3-butadiene, styrene, isoprene, isobutylene, 2,3-dimethyl-1,3-butadiene, acrylonitrile, ethylene, and propylene and the like. It is to be appreciated that any combination of elastomers, additives and second masterbatch may be added in continuous compounder 100 to the elastomer masterbatch produced in the coagulum reactor 14.

Figure 2:
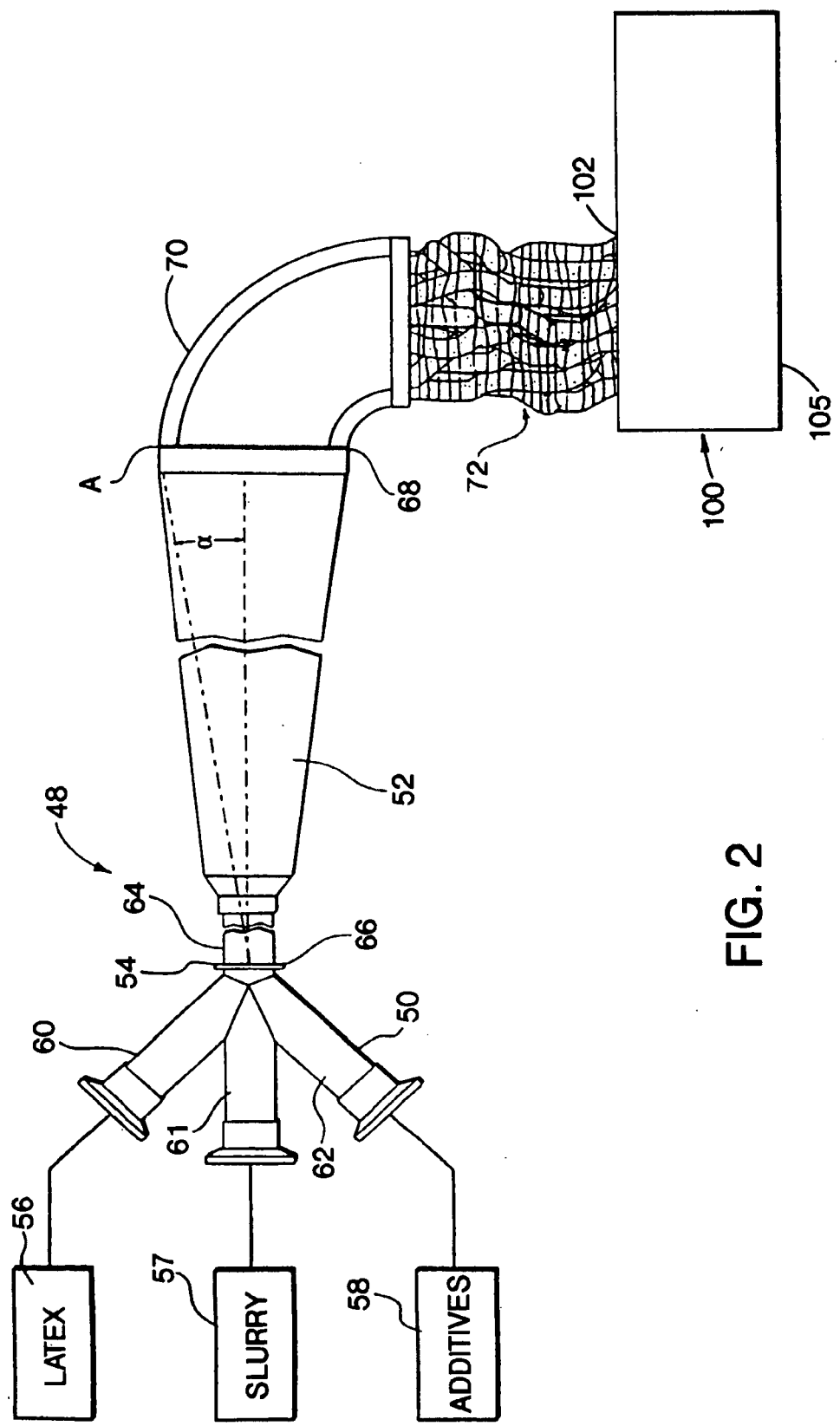
FIG. 2 is an elevation view, partly schematic, of a preferred embodiment consistent with the schematic flow chart illustration of FIG. 1.

The dimensions and particular design features of the coagulum reactor 14, including the mixing zone/coagulum zone assembly, suitable for an embodiment in accordance with FIG. 1, will depend in part on such design factors as the desired throughput capacity, the selection of materials to be processed, etc. One preferred embodiment is illustrated in FIG. 2 wherein a coagulum reactor 48 has a mixing head 50 attached to a coagulum zone 52 with a fluid-tight seal at joint 54. FIG. 2 schematically illustrates a first subsystem 56 for feeding elastomer latex to the mixing zone, subsystem 57 for feeding carbon black slurry or other particulate filler fluid to the mixing zone, and subsystem 58 for feeding an optional additive fluid, pressurized air, etc. to the mixing zone. The mixing head 50 is seen to have three feed channels 60, 61, 62. Feed channel 60 is provided for the natural rubber latex fluid and feed channel 62 is provided for direct feed of gas and/or additive fluid. In connection with preferred embodiments employing direct injection of additives, significant advantage is achieved in connection with hydrocarbon additives or, more generally, non-water miscible additives. While it is well known to employ emulsion intermediates to create additive emulsions suitable for pre-blending with an elastomer latex, preferred embodiments in accordance with the present disclosure employing direct injection of additives can eliminate not only the need for emulsion intermediates, but also the equipment such as tanks, dispersing equipment, etc. previously used in forming the emulsions. Reductions in manufacturing cost and complexity can, therefore, be achieved. As discussed farther below, the feed channel 61 through which slurry is fed to the mixing zone is preferably coaxial with the mixing zone and the coagulum zone of the coagulum reactor. While only a single feed channel is shown to receive the elastomer latex fluid, any suitable number of feed channels may be arranged around the central feed channel through which the slurry is fed to the mixing zone. Thus, for example, in the embodiment of FIG. 2 a fourth feed channel could be provided through which ambient air or high pressure air or other gas is fed to the mixing zone. Pressurized air may be injected likewise with the slurry through the central axial feed channel 61. Auxiliary feed channels can be temporarily or permanently sealed when not in use.

The coagulum zone 52 of the coagulum reactor 48 is seen to have a first portion 64 having an axial length which may be selected depending upon design objectives for the particular application intended. Optionally, the coagulum zone may have a constant cross-sectional area over all or substantially all of its axial length. Thus, for example, the coagulum reactor may define a simple, straight tubular flow channel from the mixing zone to the discharge end. Preferably, however, for reasons discussed above, and as seen in the preferred embodiment illustrated in the drawings, the cross-sectional area of the coagulum zone 52 increases progressively from the entry end 66 to discharge end 68. More specifically, the cross-sectional area increases in the longitudinal direction from the entry end to the discharge end. In the embodiment of FIG. 2, the coagulum zone increases in cross-sectional area progressively in the sense that it increases continuously following constant cross-sectional portion 64. References to the diameter and cross-sectional area of the coagulum reactor (or, more properly, the coagulum zone defined within the coagulum reactor) and other components, unless stated otherwise, are intended to mean the cross-sectional area of the open flow passageway and the inside diameter of such flow passageway.

Elastomer composite, specifically, coagulated elastomer latex in the form of masterbatch crumb 72, is seen being discharged from the coagulum reactor 48 through a diverter 70. Diverter 70 is an adjustable conduit attached to the coagulum reactor at discharge end 68. It is adjustable so as to selectively pass the elastomer masterbatch crumb 72 to any of various different receiving sites. This feature advantageously facilitates removal of masterbatch crumb from the product stream, for example, for testing or at the beginning of a production run when initial process instability may result temporarily in inferior product. In addition, the diverter provides design flexibility to direct product from the coagulum reactor to different post-processing paths. In accordance with the preferred embodiment of FIG. 1, the masterbatch crumb 72 being discharged from coagulum reactor 48 through diverter 70 is seen to be received by de-watering extruder 40 and from there fed into continuous compounder 100 via feed port 102.

The cross-sectional dimension of coagulum reactor 48 is seen to increase at an overall angle $\alpha$ between entry end 66 and discharge end 68. Angle $\alpha$ is greater than 0° and in preferred embodiments is less than 45°, more preferably less than 15°, most preferably from 0.5° to 5°. The angle $\alpha$ is seen to be a half angle, in that it is measured from the central longitudinal axis of the coagulum zone to a point A at the outer circumference of the coagulum zone at the end of the coagulum reactor. In this regard, it should be understood that the cross-sectional area of the upstream portion of the coagulum reactor, that is, the portion near the entry end 66, preferably increases sufficiently slowly to achieve quasi-molding of the coagulum in accordance with the principles discussed above. Too large an angle of expansion of the coagulum zone may result in the elastomer masterbatch not being produced in desirable crumb form of globules or worms and simply spraying through the coagulum reactor. Increasing the bore of the coagulum reactor too slowly can result, in certain embodiments, in backup or clogging of the feeds and reaction product into the mixing head. In a downstream portion of the coagulum zone, wherein the latex has been substantially coagulated and flow has become essentially plug flow, the coagulum zone may extend either with or without increase in cross-sectional area. Thus, reference here to the coagulum zone in preferred embodiments having a progressively increasing cross-sectional area should be understood to refer primarily to that portion of the coagulum zone wherein flow is not substantially plug flow.

The cross-sectional area of the coagulum zone (that is, at least the upstream portion thereof, as discussed immediately above) may increase in step-wise fashion, rather than in the continuous fashion illustrated in the embodiment of FIG. 2. In the embodiment illustrated in FIG. 3, a continuous flow system for production of elastomer masterbatch in accordance with the method and apparatus disclosed here, is seen to include a mixing head/coagulum zone assembly wherein the cross-sectional area of the coagulum zone increases in step-wise fashion. Preferably, the individual sections of the coagulum zone in such a step-wise embodiment have a flared connection to adjacent sections. That is, they combine to form a smooth and generally continuous coagulum zone surface, as opposed, for example, to a sharp or instantaneous increase in diameter from one section to the next. The coagulum zone of FIG. 3 increases in three steps, such that there are four different sections or sub-zones 74–77. Consistent with the design principles discussed immediately above, the cross-sectional area of coagulum zone 53 increases from the entry end 66 to point A at the discharge end 68 at an overall angle which achieves the necessary flow control in the upstream portion of the coagulum reactor. The first section 74 can be taken as including (a) the constant diameter portion of the mixing head 50 immediately downstream of the mixing zone, and (b) the same or similar diameter portion connected thereto at joint 54 at the entry end 66. This first section has a constant cross-sectional diameter $D_1$ and an axial dimension or length $L_1$. In this first section 74 the length $L_1$ should be greater than three times the diameter $D_1$, more preferably greater than five times $D_1$ and most preferably from about 12 to 18 times $D_1$. Typically, this section will have a length of about fifteen times $D_1$. Each subsequent section preferably has a constant cross-sectional dimension and cross-sectional area approximately double that of the preceding (i.e., upstream) section. Thus, for example, section 75 has a constant cross-sectional dimension and a cross-sectional area which is twice that of section 74. Similarly, the cross-sectional area of section 76 is double that of section 75, and the cross-sectional area of section 77 is double that of section 76. In each of sections 75–77, the length is preferably greater than three times its diameter, more preferably about three to seven times its diameter and generally about five times its diameter. Thus, for example, in section 76 longitudinal dimension $L_3$ is preferably about five times its diameter $D_3$.

Figure 3:
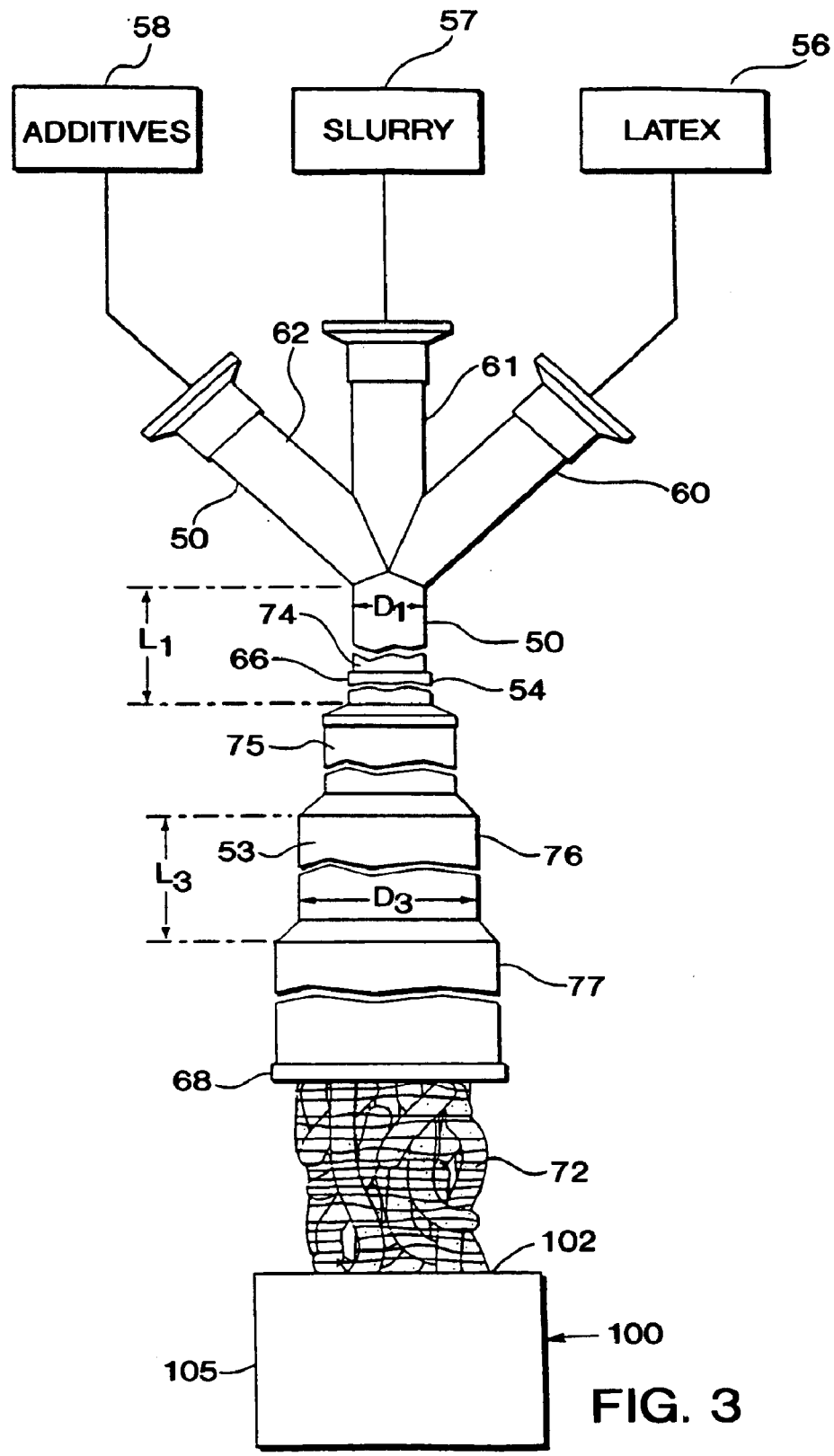
FIG. 3 is an elevation view, partially schematic, of an alternative preferred embodiment consistent with the schematic flow chart illustration of FIG. 1.
Figure 4:
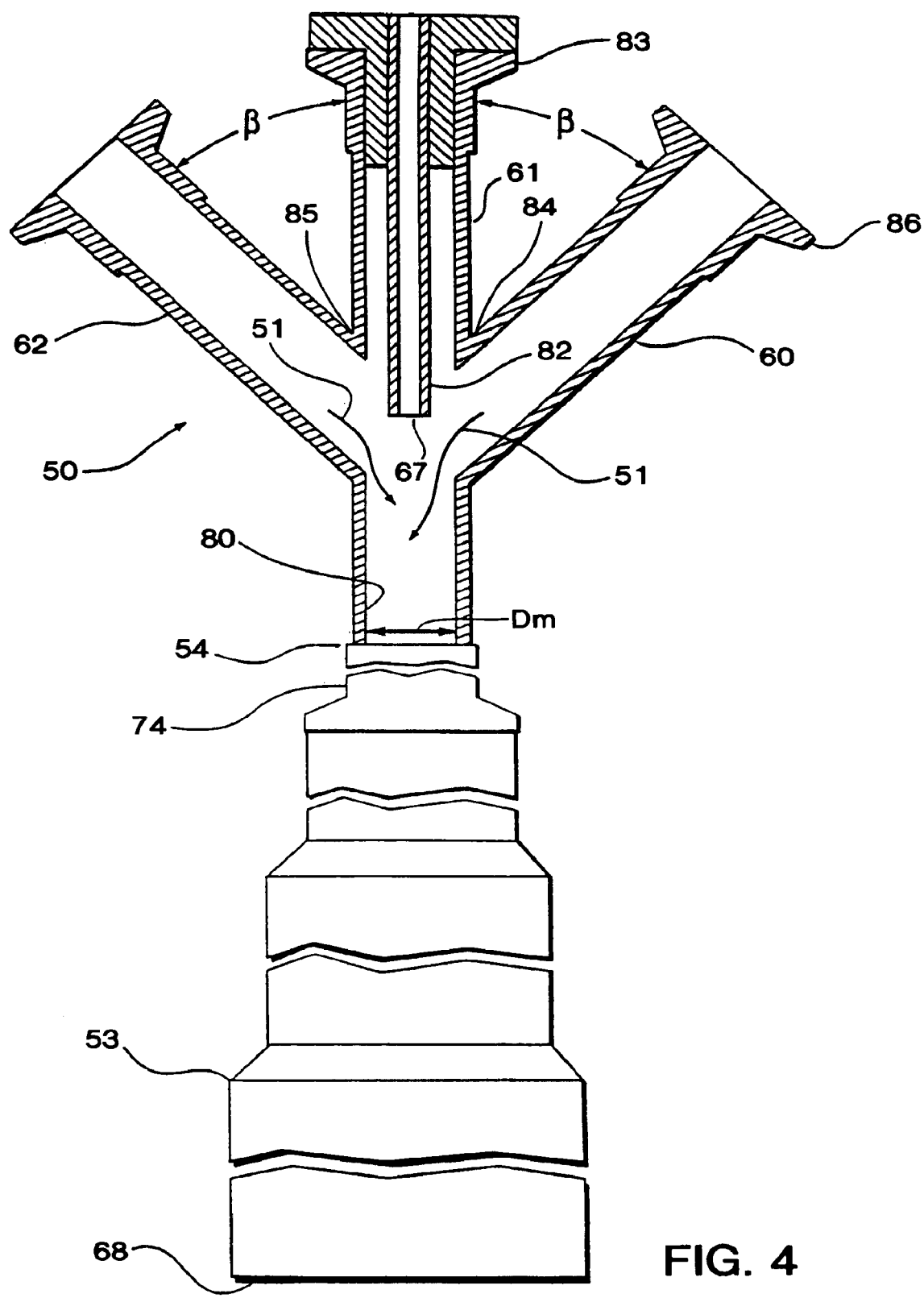
FIG. 4 is an elevation view, partially in section, of the mixing head/coagulum reactor assembly of the embodiment of FIG. 3.

A mixing head and coagulum zone assembly corresponding to the embodiment of FIG. 3 is shown in FIG. 4 partially in section view. Mixing head 50 is integral with coagulum zone extender 53 via joint 54. It defines a mixing zone wherein multiple feed channels 60, 61, 62 form a junction, with an elongate, substantially cylindrical channel 80 substantially coaxial with the coagulum zone portion within extender 53. It will be recognized that it is not essential to the operability of the method and apparatus disclosed here, to precisely define the boundaries of the mixing zone and/or coagulum zone. Numerous variations are possible in the design of the flow channels junction area, as will be apparent to those skilled in the art given the benefit of the present disclosure. In that regard, as a generally preferred guideline, in embodiments of the type illustrated in FIG. 4, for example, the slurry tip 67 generally is upstream of the beginning of cylindrical portion 80, being approximately centered longitudinally in the junction of the feed channels. In such embodiments, preferably, the minimum cross-sectional area defined by the imaginary cone from the slurry tip 67 to the circumferential perimeter at the beginning of the cylindrical portion 80 is advantageously greater than, or at least equal to, the cross-sectional area of the latex feed channel 60. Preferably, both channel 80 and at least the upstream portion of the coagulum zone wherein flow turbulence exists prior to substantially complete coagulation of the elastomer latex, have a circular cross-section.

The means for feeding carbon black slurry or other particulate filler fluid is seen to comprise a feed tube 82 extending substantially coaxially with the mixing chamber to an opening or slurry nozzle tip 67 which is open toward the coagulum zone. This is a highly advantageous feature of the preferred embodiments discussed here. The carbon black slurry, as noted above, is fed to the mixing zone at very high velocity relative the feed velocity of the latex, and the axial arrangement of narrow bore feed tube 82 results in excellent development of flow turbulence. The diameter $D_m$ of the channel 80 (which, as noted above, is preferably substantially equal to the diameter $D_1$ of immediately following portion of section 74 of the coagulum zone) preferably is at least twice the inside diameter of slurry feed tube 82, more preferably about four to eight times the diameter of feed tube 82, typically about seven to eight times that diameter. Feed tube 82 is seen to form a fluid-tight seal with the entry port 83 at the upstream end of feed channel 61 of mixing head 50. The diameter of the axial feed tube 82 is determined largely by the required volumetric flow rate and axial velocity of the slurry as it passes through the slurry nozzle tip 67 into the mixing chamber. The correct or required volume and velocity can be readily determined by those skilled in the art given the benefit of this disclosure, and will be a function, in part, of the concentration and choice of materials. Embodiments such as that illustrated and disclosed here, wherein the feed tube for the carbon black slurry is removable, provide desirable flexibility in manufacturing different masterbatch compositions at different times. The feed tube used in one production run can be removed and replaced by a larger or smaller bore tube appropriate to a subsequent production. In view of the pressure and velocity at which the slurry exits the feed tube, it may be referred to as a spray or jet into the mixing zone. This should be understood to mean in at least certain embodiments, high speed injection of the slurry into an area already substantially filled with fluid. Thus, it is a spray in the sense of its immediate distribution as it passes through the slurry nozzle tip, and not necessarily in the sense of free-flying material droplets in a simple spreading trajectory.

The additional feed channels 60 and 62 are seen to form a junction 84, 85, respectively, with feed channel 60 and downstream channel 80 at an angle β. The angle β may in many embodiments have a value from greater than 0° to less than 180°. Typically, β may be, for example, from 30°–90°. It is desirable to avoid a negative pressure, that is, cavitation of the latex fluid as it is entrained by the high velocity slurry exiting at slurry nozzle tip 67, since this may disadvantageously cause inconsistent mixing leading to inconsistent masterbatch product. Air or other gas can be injected or otherwise fed to the mixing zone to assist in breaking any such vacuum. In addition, an expanded feed line for the natural rubber latex leading to the entry port 86 of feed channel 60 is desirable to act as a latex fluid reservoir. In the preferred embodiment of FIG. 4, latex feed channel 60 intersects the mixing zone adjacent slurry nozzle tip 67. Alternatively, however, the latex feed channel can intersect the mixing channel upstream or downstream of the slurry nozzle tip 67.

The carbon black slurry or other particulate filler fluid typically is supplied to feed tube 82 at a pressure above about 300 psig, such as about 500 to 5000 psig, e.g. about 1000 psig. Preferably the liquid slurry is fed into the mixing zone through the slurry nozzle tip 67 at a velocity above 100 ft. per second, preferably about 100 to about 800 ft. per second, more preferably about 200 to 500 ft. per second, for example, about 350 feet per second. Arrows 51 in FIG. 4 represent the general direction of flow of the elastomer latex and auxiliary feed materials through feed channels 60 and 62 into the channel 80 below slurry nozzle tip 67. Thus, the slurry and latex fluids are fed to the mixing zones at greatly different feed stream velocities, in accordance with the numbers set forth above. While not wishing to be bound by theory, it presently is understood that the differential feed achieves latex shear conditions in the mixing zone leading to good macro-dispersion and coagulation.

Figure 5:
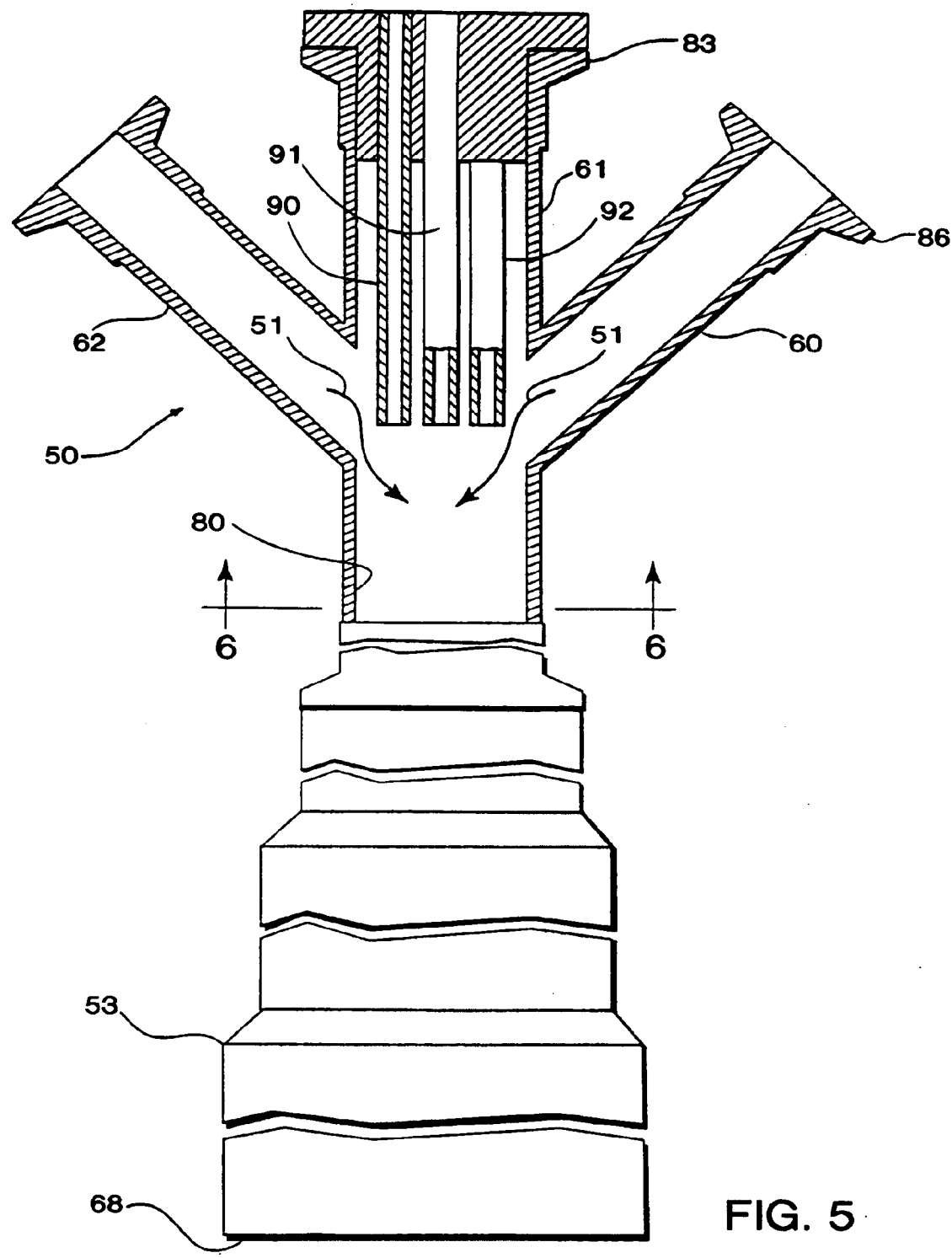
FIG. 5 is an elevation view, partially in section, corresponding to the view of FIG. 4, illustrating an alternative preferred embodiment.
Figure 6:
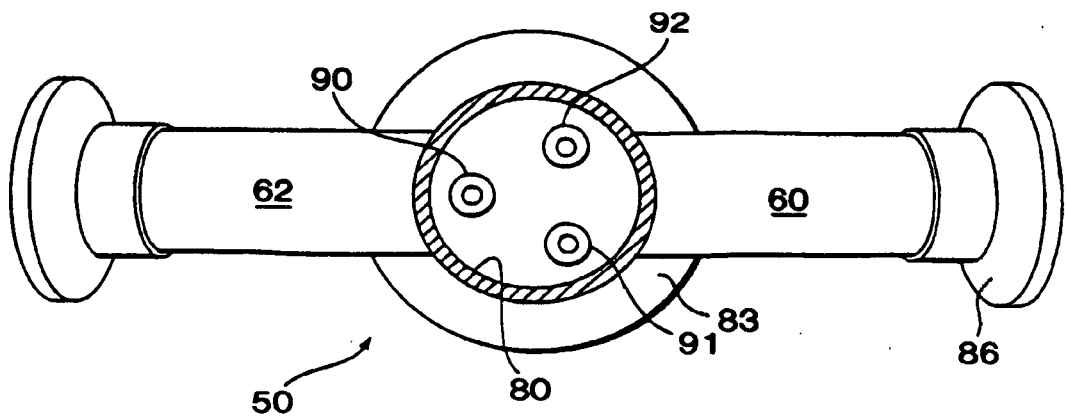
FIG. 6 is a section view taken through line 6—6 of FIG. 5.

An alternative preferred embodiment is illustrated in FIGS. 5 and 6 wherein the single axial feed tube 82 in the embodiment of FIG. 4 is replaced by multiple axially extending feed tubes 90–92. Even greater numbers of feed tubes may be employed, for example, up to about 6 or 8 axially-extending feed tubes. Advantageously, production flexibility is achieved by using different feed tubes of different diameter for production of different formulations. Also, multiple feed tubes can be used simultaneously to achieve good flow turbulence within the mixing zone and coagulum zone of the coagulum reactor.

Figure 7:
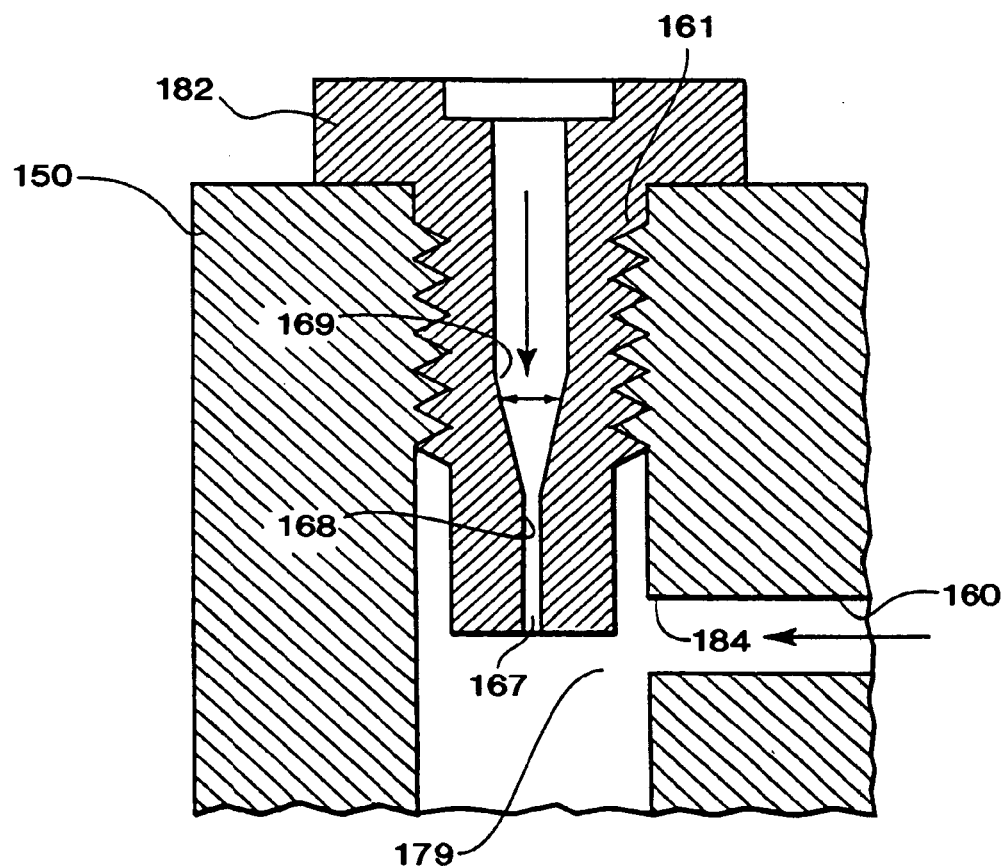
FIG. 7 is a section view of a mixing head suitable for use in an alternative preferred embodiment.

An alternative embodiment of the mixing head is illustrated in FIG. 7. Mixing head 150 is seen to define a mixing zone 179. An axial feed channel 161 receives a feed tube 182 adapted to feed carbon black slurry or other particulate filler fluid at high velocity into the mixing chamber 179. It can be seen that the central bore in feed tube 182 terminates at slurry nozzle tip 167. A constant diameter nozzle land 168 is immediately upstream of slurry nozzle tip 167, leading to a larger bore area 169. Preferably the axial dimension of land 168 is about 2 to 6, e.g. about 5, times its diameter. A second feed channel 160 forms a junction 184 with the mixing zone 179 at a 90° angle for feeding elastomer latex fluid to the mixing zone. The cross-sectional diameter of the latex fluid feed channel 160 is substantially larger than the cross-sectional diameter of the slurry nozzle tip 167 and land 168. Without wishing to be bound by theory, the axial elongation of nozzle land 168, coupled with the expanded diameter bore section upstream of the nozzle land, is believed to provide advantageous stability in the flow of slurry through feed tube 182 into the mixing zone 179. The bore of feed tube 182 is found to function well with a 20° chamfer, that is, conical area 169 which expands in the upstream direction at about a 20° angle. Downstream of mixing zone 179 is an elongate coagulum zone. Consistent with the principles discussed above, such coagulum zone need be only marginally elongate. That is, its axial dimension need be only marginally longer than its diameter. Preferably, however, a progressively enlarged coagulum zone is used.

As discussed above, coagulation of the elastomer masterbatch is substantially complete at or before the end of the coagulum reactor. That is, coagulation occurs within the coagulum zone of the coagulum reactor without the necessity of adding a stream of coagulant solution or the like. This does not exclude the possibility that some initial coagulation occurs in the mixing zone. The mixing zone may be considered an extended portion of the coagulum zone for this purpose. Also, reference to substantially complete coagulation prior to the elastomer masterbatch exiting the coagulum reactor is not meant to exclude the possibility of subsequent processing and follow-on treatment steps, for any of various purposes appropriate to the intended use of the final product. In that regard, substantially complete coagulation in preferred embodiments of the novel method disclosed here employing natural rubber latex means that at least about 95 weight percent of the rubber hydrocarbon of the latex is coagulated, more preferably at least about 97 weight percent, and most preferably at least about 99 weight percent is coagulated.

The method and apparatus disclosed and described here produce elastomer composites having excellent physical properties and performance characteristics. Novel elastomer composites of the present invention include masterbatch compositions produced by the above-disclosed method and apparatus, as well as intermediate compounds and finished products made from such masterbatch compositions. Notably, elastomer masterbatch can be produced using natural rubber latex (latex concentrate or field latex), along with various grades of carbon black filler, having excellent physical properties and performance characteristics. Carbon blacks presently in broad commercial use for such application as tire tread have been used successfully, as well as carbon blacks heretofore considered unsuitable for commercial use in known production apparatus and methods. Those unsuitable because their high surface area and low structure rendered them impractical to achieve acceptable levels of macro-dispersion at routine commercial loading levels for the carbon black and/or to preserve the molecular weight of the elastomer are highly preferred for the novel elastomeric masterbatch compositions disclosed here. Such elastomer composites are found to have excellent dispersion of the carbon black in the natural rubber, controlled Mooney Viscosity and moisture level, together with good preservation of the molecular weight of the natural rubber. Moreover, these advantageous results were achieved without the need for a coagulation step involving a treatment tank or stream of acid solution or other coagulant. Thus, not only can the cost and complexity of such coagulant treatments be avoided, so too the need to handle effluent streams from such operations.

Prior known dry mastication techniques could not achieve equal dispersion of such fillers without significant molecular weight degradation, nor was the Mooney Viscosity of the masterbatch controlled to a desired level and, therefore, could not produce the novel natural rubber masterbatch compositions made in accordance with certain preferred embodiments of the present invention. In that regard, novel elastomer composites are disclosed having excellent macro-dispersion of the carbon black in the natural rubber and controlled Mooney Viscosity and moisture level, even of carbon blacks having a structure to surface area ratio DBPA:CTAB less than 1.2 and even less than 1.0, with high molecular weight of the natural rubber. Known mixing techniques in the past did not achieve such excellent macro-dispersion of carbon black without significant molecular weight degradation of the natural rubber and, therefore, did not produce the novel masterbatch compositions and other elastomer composites of the present invention. Preferred novel elastomer masterbatch compositions in accordance with this disclosure, having carbon black macro-distribution levels and controlled Mooney Viscosity levels not heretofore achieved, can be used in place of prior known masterbatch having poorer macro-dispersion. Thus, masterbatch disclosed here can be incorporated into cured compounds in accordance with known techniques. Such novel cured compounds are found in preferred embodiments to have physical characteristics and performance properties generally comparable to, and in some instances significantly better than, those of otherwise comparable cured compounds comprising masterbatch of poorer macro-dispersion. Masterbatch can be produced in accordance with the present invention, however, with reduced mixing time, reduced energy input, and/or other cost savings.

Particularly with respect to certain preferred embodiments, natural rubber latex and carbon black filler masterbatch can be produced having excellent physical characteristics and performance properties. Excellent macro-dispersion of the carbon black is achieved, even using carbon blacks of exceptionally high surface area and low structure, without the degree of degradation of the natural rubber which would be caused by dry mastication for sufficient time and at sufficient intensity levels to achieve the same degree of carbon black dispersion. Especially advantageous in this regard are novel natural rubber masterbatch compositions wherein a high degree of dispersion is achieved, using carbon blacks having structure to surface area ratio, DBPA: CTAB of less than 1.2 and even less than 1.0. As used here, the carbon black structure can be measured as the dibutyl phthalate adsorption (DBPA) value, expressed as cubic centimeters of DBPA per 100 grams carbon black, according to the procedure set forth in ASTM D2414. The carbon black surface area can be measured as CTAB expressed as square meters per gram of carbon black, according to the procedure set forth in ASTM D3765-85. Novel natural rubber masterbatch is achieved, therefore, having heretofore unachievable combinations of physical characteristics such as molecular weight distribution and filler dispersion levels, and/or incorporating heretofore unsuitable fillers such as carbon black of extraordinarily high surface area and low structure. The dispersion quality of natural rubber masterbatch produced in accordance with the methods and apparatus disclosed here can be demonstrated with reference to the well known characteristics of $MW_{sol}$ (weight average) and macro-dispersion. Specifically, the macro-dispersion level in masterbatch produced in accordance with preferred embodiments is significantly better than that in masterbatch of approximately equal $MW_{sol}$ produced using dry mastication. Most notably, the dispersion quality of these preferred embodiments does not depend significantly on the morphology of the carbon black filler. It will be recognized that other factors affecting the level of dispersion achievable using the method and apparatus disclosed here, include the concentration of the carbon black in the slurry, total energy input into the slurry and energy input during mixing of the fluid streams, etc.

The macro-dispersion quality of carbon black in natural rubber masterbatch disclosed here is significantly better than that in previously known masterbatch of approximately equal $MW_{sol}$ (weight average). In some preferred embodiments of novel elastomer composites, excellent carbon black distribution is achieved with $MW_{sol}$ approximately that of natural rubber in the field latex state, (e.g., approximately 1,000,000) a condition not previously achieved. The dispersion quality advantage is especially significant in the above mentioned preferred embodiments using carbon black with low structure and high surface area, e.g., DBPA less than 110 cc/100 g, CTAB greater than 45 to 65 $m^2/g$, and DBPA:CTAB less than 1.2 and preferably less than 1.0.

The methods and apparatus of the present invention provide elastomer masterbatch improved commercial value of the masterbatch. Controlling the Mooney Viscosity and moisture level of the elastomer masterbatch provides a product which is better suited for certain preferred end use applications. Employing the continuous compounder reduces or even eliminates the need for further mastication in downstream processes at end user facilities. Providing additional elastomers, additives and masterbatch within the continuous compounder eliminates additional processing steps at end user facilities where the masterbatch is used to produce end products.

The methods and apparatus of the present invention can be used to form products which include, but are not limited to tires, tire treads, tire sidewalls, wire-skim for tires, cushion gum for retread tires, rubber components of engine mounts, tank tracks, mining belts, rubber components of hydro-mounts, bridge bearings, and seismic isolators.

Results of experiments using the invention disclosed herein follow, wherein "FCM" represents the continuous compounder, or Farrel Unimix Continuous Mixer, and "OM" represents the open mill:

Trial #1 Data

This trial was conducted to test the drying capability of the continuous compounder (FCM). This trial was also designed to test the capability to add and incorporate a stream of oil. This wet sample was made from natural rubber latex concentrate and N351 type carbon black. The masterbatch was fed into the continuous compounder with a moisture level of approximately 20 weight percent.

| Sample | CB Loading (phr) | Oil Loading (phr) | Rate (lb/hr dry) | RPM | Orifice (%) | Product Temp (F.) | Moisture (%) | MV | MW | Bound Rubber |
|---|---|---|---|---|---|---|---|---|---|---|
| Bin #1 initial product | 35 | — | — | — | — | — | ~20 | 112.5 | 762K | 49.77 |
| Bin #2 initial product | 35 | — | — | — | — | — | ~20 | 110.1 | 740K | 44.94 |
| #1 | 34 | 17 | 465 | 500 | 33 | 275 | 1.32 | 68.7 | 681K | 31.55 |
| #2 | 35 | 18 | 372 | 500 | 23 | 300 | 0.70 | 68.6 | 692K | 33.64 |
| #3 | 34 | 18 | 372 | 510 | 17 | 315 | 0.14 | 68.2 | 687K | 37.28 |
| #4 | — | 17 | 372 | 510 | 17 | 330 | 0.40 | 66.2 | 672K | 32.63 |
| #5 | 34 | 20 | 419 | 450 | 32 | 306 | 0.39 | 65.6 | 702K | 34.68 |

Trial #2 Data

This trial was conducted to test the drying capability of the continuous compounder (FCM). This trial was also designed to test the capability to add and incorporate a stream of oil. This wet sample was made from natural rubber field latex and N220 type carbon black. The masterbatch was fed into the continuous compounder with a moisture level of approximately 25 weight percent.

| Sample | CB Loading (phr) | Oil Loading (phr) | Rate (lb/hr dry) | RPM | Orifice (%) | Product Temp (F.) max | Moisture (%) | MV | MW | Bound Rubber |
|---|---|---|---|---|---|---|---|---|---|---|
| Bin #1 initial product | 54 | — | — | — | — | — | ~25 | 196.0 | 707K | 76.63 |
| Bin #2 initial product | — | — | — | — | — | — | ~25 | 160.9 | 723K | 75.84 |
| #12 | 54 | 4 | 400 | 425 | 35 | 325 | 0.25 | 135.4 | 537K | 72.79 |
| #13 | 54 | 3 | 336 | 375 | 38 | 340 | 0.08 | 135.9 | 510K | 70.11 |

Trial #3 Data

This trial was conducted to test the drying capability of the continuous compounder (FCM). The open mill (OM) was also incorporated into this trial. This trial was also designed to test the capability to add and incorporate streams of oil, stearic acid (SA), and an antioxidant (Santoflex 6PPD). This wet sample was made from natural rubber field latex and Cabot experimental carbon black A. The masterbatch was fed into the continuous compounder with a moisture level of approximately 22 weight percent.

| Sample | CB Loading (phr) | Oil Loading (phr) | SA/ 6PPD Loading (phr) | Rate (lb/hr dry) | RPM | Orifice (%) |
|---|---|---|---|---|---|---|
| initial product | 50 | — | — | — | — | — |
| 6A OM | 49 | — | — | — | — | — |
| 7A FCM | 49 | — | 2/1 | 302 | 260 | 42 |
| 7A OM | — | — | 7 | 217 | — | — |
| 8A FCM | 46 | 5 | 2/1 | 312 | 265 | 41 |
| 8A OM | — | 5 | 2/1 | 200 | — | — |

| Sample | Maximum Product Temp (F.) max | Moisture (%) | MV | MW | Bound Rubber | Macro-Dispersion |
|---|---|---|---|---|---|---|
| initial product | — | ~22 | 194 | 609K | 77.81 | A-4/0.30 |
| 6A OM | — | — | 171 | 332K | 69.30 | A-4/0.06 |
| 7A FCM | 350 | 0.25 | 157 | 517K | 74.66 | A-4/0.13 |
| 7A OM | 190 | 0.35 | 135 | 386K | 66.84 | — |
| 8A FCM | 320 | 0.58 | 138 | 496K | 70.83 | A-4/0.10 |
| 8A OM | — | 0.61 | 118 | 440K | 56.82 | — |

Trial #4 Data

This trial was conducted to test the drying capability of the continuous compounder (FCM). The open mill (OM) was also incorporated into this trial. This trial was also designed to test the capability to add and incorporate streams of oil, stearic acid (SA), silica, and an antioxidant (Santoflex 6PPD). This wet sample was made from natural rubber field latex and N220 type carbon black. The masterbatch was fed into the continuous compounder with a moisture level of approximately 25 weight percent.

| Sample | CB Loading (phr) | Oil Loading (phr) | Silica Loading (phr) | SA/ 6PPD Loading (phr) | Rate (lb/hr dry) | RPM | Orifice (%) |
|---|---|---|---|---|---|---|---|
| initial product | 53 | — | — | — | — | — | — |
| 1A FCM | 53 | — | — | — | 500 | 450 | 42 |
| 1A OM | — | — | — | — | 240 | — | — |
| 2C FCM | 53 | 8.5 | — | — | 453 | 485 | 35 |
| 2C OM | 55 | 8.5 | — | — | 380 | — | — |
| 3A FCM | 52 | 8.5 | — | 3.1/3.1 | 487 | 500 | 40 |
| 3A OM | 51 | 8.5 | — | 3.1/3.1 | 540 | — | — |
| 5A FCM | 52 | 8.5 | 8 | 3.1/3.1 | 470 | 490 | 41 |
| 5A OM | 51 | 8.5 | 8 | 3.1/3.1 | 540 | — | — |

| Sample | Maximum Product Temp (F.) | Moisture (%) | MV | MW | Bound Rubber % | Macro-Dispersion |
|---|---|---|---|---|---|---|
| initial product | — | ~25 | 154 | 688K | 55.79 | B-5/0.40 |
| 1A FCM | — | 1.27 | 148 | 536K | 69.33 | A-4/0.07 |
| 1A OM | 200 | 0.23 | 134 | 493K | 69.44 | — |
| 2C FCM | 320 | 0.39 | 98 | 557K | 60.62 | A-3/0.03 |
| 2C OM | 240 | 0.22 | 108 | 494K | 66.91 | A-3/0.09 |
| 3A FCM | 340 | 0.06 | 90 | 610K | 36.31 | A-3/0.02 |
| 3A OM | 210 | 0.25 | 90 | 636K | 42.61 | A-4/0.11 |
| 5A FCM | 330 | 0.24 | 103 | 573K | 51.70 | B-4/0.33 |
| 5A OM | 210 | 0.34 | 90 | 552K | 48.67 | A-4/0.20 |

Trial #5 Data

This trial was conducted to test the drying capability of the continuous compounder (FCM). The open mill (OM) was also incorporated into this trial. This wet sample was made from natural rubber field latex and N234 type carbon black. The masterbatch was fed into the continuous compounder with a moisture level of approximately 24 weight percent.

| Sample | CB Loading (phr) | Rate (lb/hr dry) | RPM | Orifice (%) | Maximum Product Temp (F.) |
|---|---|---|---|---|---|
| initial product | 51 | — | — | — | — |
| FC1 FCM | 52 | 300 | 250 | 44 | 340 |
| FC1 OM | 52 | — | — | — | — |

| Sample | Moisture (%) | MV | MW | Bound Rubber % | Macro-Dispersion |
|---|---|---|---|---|---|
| initial product | ~24 | 218 | 645K | 72.21 | A-4/0.18 |
| FC1 FCM | 0.50 | 160 | 467K | 69.36 | A-3/0.03 |
| FC1 OM | 0.15 | 141 | 335K | 63.55 | A-4/0.12 |

Trial #6 Data

This trial was conducted to test the drying capability of the continuous compounder (FCM). The open mill (OM) was also incorporated into this trial. This trial was also designed to test the capability to add and incorporate streams of oil, stearic acid (SA), zinc oxide (ZnO), silica, and an antioxidant (Santoflex 6PPD). The feasibility of adding butadiene rubber was also investigated for sample FA4 during this trial. This wet sample was made from natural rubber field latex and N220 type carbon black. The masterbatch was fed into the continuous compounder with a moisture level of approximately 20 weight percent.

| Sample | CB Loading (phr) | Oil Loading (phr) | Silica Loading (phr) | SA/ 6PPD/ ZnO Loading (phr) | Rate (lb/hr dry) | RPM | Orifice (%) |
|---|---|---|---|---|---|---|---|
| initial product | 74 | — | — | — | — | — | — |
| FA3 FCM | — | 7.9 | 7.1 | 2.9/2.9/5.0 | 400 | 300 | 59 |

-continued

| Sample | Maximum Product Temp (F.) | Moisture (%) | MV | MW | Bound Rubber % | Macro-Dispersion |
|---|---|---|---|---|---|---|
| FA3 OM | 73 | 7.9 | 7.1 | 2.9/<br>2.9/<br>5.0 | — | — | — |
| FA4 FCM | — | 5.5 | 5.0 | 2.0/<br>2.0/<br>3.5 | 400 | 300 | 48 |
| FA4 OM | 55 | 5.5 | 5.0 | 2.0/<br>2.0/<br>3.5 | — | — | — |

| Sample | Maximum Product Temp (F.) | Moisture (%) | MV | MW | Bound Rubber % | Macro-Dispersion |
|---|---|---|---|---|---|---|
| initial product | — | ~20 | >200 | 611K | 70.74 | A-3/0.10 |
| FA3 FCM | 335 | 0.37 | 154 | 483K | 70.71 | A-3/0.10 |
| FA3 OM | — | 0.14 | 133 | 362K | 54.58 | A-4/0.17 |
| FA4 FCM | 330 | 0.63 | 125 | 370K | 44.08 | — |
| FA4 OM | — | 0.19 | 113 | 376K | 43.68 | C-6/1.36 |

Trial #7 Data

This trial was conducted to test the drying capability of the continuous compounder (FCM). The open mill (OM) was also incorporated into this trial. This trial was also designed to test the capability to add and incorporate streams of oil, stearic acid (SA), zinc oxide (ZnO), silica, and an antioxidant (Santoflex 6PPD). This wet sample was made from natural rubber field latex and N220 type carbon black. The masterbatch was fed into the continuous compounder with a moisture level of approximately 24 weight percent.

| Sample | CB Loading (phr) | Oil Loading (phr) | Silica Loading (phr) | SA/ 6PPD/ ZnO Loading (phr) | Rate (lb/hr dry) | RPM | Orifice (%) |
|---|---|---|---|---|---|---|---|
| initial product | 53 | — | — | — | — | — | — |
| FB1 FCM | 53 | 8.5 | — | 3.1/<br>3.1 | 400 | 410 | 39 |
| FB1 OM | 54 | 8.5 | — | 3.1/<br>3.1 | — | — | — |
| FB2 FCM | 53 | 8.5 | 7.7 | 3.1/<br>3.1/<br>5.4 | 400 | 330 | 49 |
| FB2 OM | 53 | 8.5 | 7.7 | 3.1/<br>3.1/<br>5.4 | — | — | — |

| Sample | Max Product Temp (F.) | Moisture (%) | MV | MW | Bound Rubber % | Macro-Dispersion |
|---|---|---|---|---|---|---|
| initial product | — | ~24 | 189 | 751K | 63.42 | A-3/0.09 |
| FB1 FCM | 339 | 0.45 | 84 | 671K | 41.04 | A-3/0.07 |
| FB1 OM | — | 0.31 | 86 | 600K | 43.91 | A-4/0.06 |
| FB2 FCM | 342 | 0.44 | 78 | 609K | 49.85 | A-4/0.14 |
| FB2 OM | — | 0.26 | 80 | 468K | 49.34 | A-4/0.17 |

In view of the foregoing disclosure, it will be apparent to those skilled in the art that various additions, modifications, etc. can be made without departing from the true scope and spirit of the invention. All such additions and modifications are intended to be covered by the following claims.

We claim:

1. Apparatus for producing elastomer composite of particulate filler dispersed in elastomer, comprising:

a coagulum reactor defining a mixing zone and an elongate coagulum zone extending from the mixing zone to a discharge end:

latex feed means for feeding elastomer latex fluid continuously to the mixing zone;

filler feed means for feeding particulate filler fluid as a continuous jet into the mixing zone to form a mixture with the elastomer latex fluid traveling from the mixing zone to the discharge end of the coagulum zone, wherein the distance between the mixing zone and the discharge end is sufficient to permit substantially complete coagulation of the elastomer latex prior to the discharge end; and a continuous compounder having a feed port operatively connected to the discharge end of the coagulum zone for receiving the coagulated mixture of elastomer latex and particulate filler, a discharge orifice, an elongate processing chamber, and a plurality of rotors axially oriented within the processing chamber.

2. The apparatus of claim 1, further comprising conveying means for conveying a substantially continuous flow of elastomer composite from the discharge end of the coagulum zone to the feed port of the continuous compounder.

3. The apparatus of claim 1, further comprising:

an open mill connected by a conveyor to the discharge orifice of the continuous compounder;

a cooling system having a water spray and connected by a conveyor to the open mill;

a granulator connected by a conveyor to the cooling system; and a baler connected by a conveyor to the granulator.

* * * * *